(12) United States Patent
Lane et al.

(10) Patent No.: US 11,218,976 B1
(45) Date of Patent: Jan. 4, 2022

(54) SYNCHRONIZED POWER AND/OR TEMPERATURE MEASUREMENT IN A MILLIMETER WAVE (MMW) FRONT END MODULE

(71) Applicant: Mixcomm, Inc., Chatham, NJ (US)

(72) Inventors: Frank Lane, Easton, PA (US); Harish Krishnaswamy, New York, NY (US)

(73) Assignee: Mixcomm, Inc., Chatham, NJ (US)

( * ) Notice: Subject to any disclaimer, the term of this patent is extended or adjusted under 35 U.S.C. 154(b) by 0 days.

(21) Appl. No.: 17/070,906

(22) Filed: Oct. 14, 2020

(51) Int. Cl.
*H04W 52/20* (2009.01)
*H04W 52/42* (2009.01)
*H04B 1/04* (2006.01)
*H04B 17/10* (2015.01)
*H04B 17/13* (2015.01)

(52) U.S. Cl.
CPC .............. *H04W 52/20* (2013.01); *H04B 1/04* (2013.01); *H04B 17/101* (2015.01); *H04B 17/13* (2015.01); *H04W 52/42* (2013.01); *H04B 2001/0416* (2013.01)

(58) Field of Classification Search
CPC .... H04W 52/20; H04W 52/42; H04B 17/101; H04B 17/13; H04B 1/04; H04B 2001/0416
See application file for complete search history.

(56) References Cited

U.S. PATENT DOCUMENTS

| 5,579,426 | A  | * | 11/1996 | Li           | G02B 6/262  |
|-----------|----|---|---------|--------------|-------------|
|           |    |   |         |              | 385/116     |
| 7,296,045 | B2 | * | 11/2007 | Sehitoglu    | G06F 17/142 |
|           |    |   |         |              | 708/400     |
| 9,887,760 | B1 | * | 2/2018  | Sridharan    | H04B 7/0842 |
| 2002/0126962 | A1 | * | 9/2002 | Kadar-Kallen | G02B 6/4246 |
|           |    |   |         |              | 385/24      |
| 2006/0078066 | A1 | * | 4/2006 | Yun          | H04L 1/0606 |
|           |    |   |         |              | 375/299     |
| 2006/0205355 | A1 | * | 9/2006 | Laroia       | H04L 1/00   |
|           |    |   |         |              | 455/66.1    |
| 2009/0181691 | A1 | * | 7/2009 | Kotecha      | H04B 7/0417 |
|           |    |   |         |              | 455/452.1   |

(Continued)

*Primary Examiner* — Dominic E Rego
(74) *Attorney, Agent, or Firm* — Straub & Straub; Michael P. Straub; Stephen P. Straub

(57) ABSTRACT

A communications device including an array antenna assembly including a plurality of transmit chains, each with a transmit power amplifier, synchronously captures transmit power measurements for each power amplifier. A baseband transmitter in the communications device determines when a predetermined symbol in a protocol, e.g. a PSS SSB symbol, is to be transmitted and sends, e.g. via a SPI, a capture command to command each of the ADCs corresponding to the power amplifiers to synchronously capture a power measurement. Power measurements are captured at the boundary of the predetermined symbol, and the power measurements represent average transmit power levels corresponding to the symbol. The power measurements are communicated to the baseband transmitter which processes the data using calibration tables and taper information. Processed power measurements are compared to desired transmitter target levels and errors are determined. Based on the errors the gains of one or more TX chains are adjusted.

20 Claims, 12 Drawing Sheets

SYNCHRONIZATION SIGNAL BLOCK (SSB) STRUCTURE

(56) References Cited

U.S. PATENT DOCUMENTS

| | | | |
|---|---|---|---|
| 2014/0173716 A1* | 6/2014 | Manipatruni | G06F 21/35 |
| | | | 726/17 |
| 2016/0197756 A1* | 7/2016 | Mestdagh | H04L 27/2649 |
| | | | 375/295 |
| 2016/0278117 A1* | 9/2016 | Sahlin | H04W 72/14 |
| 2017/0324162 A1* | 11/2017 | Khachaturian | H01Q 21/065 |
| 2018/0124815 A1* | 5/2018 | Papasakellariou | H04L 1/1861 |
| 2018/0270768 A1* | 9/2018 | Morhart | H04B 17/13 |
| 2018/0278403 A1* | 9/2018 | Yerramalli | H04W 16/14 |
| 2018/0323853 A1* | 11/2018 | Sridharan | H04B 17/11 |
| 2019/0159191 A1* | 5/2019 | Kim | H04W 72/14 |
| 2019/0260551 A1* | 8/2019 | Baldemair | H04L 27/2602 |
| 2020/0136789 A1* | 4/2020 | Baldemair | H04W 72/1268 |
| 2021/0141063 A1* | 5/2021 | Wang | G01S 7/4815 |
| 2021/0215790 A1* | 7/2021 | Maher | G01S 13/588 |

\* cited by examiner

| FIGURE 7A |
| FIGURE 7B |
| FIGURE 7C |
| FIGURE 7D | that # SYNCHRONIZED POWER AND/OR TEMPERATURE MEASUREMENT IN A MILLIMETER WAVE (MMW) FRONT END MODULE

FIELD

The present application relates to methods and apparatus for measuring and controlling transmission power in a communications device, and more particularly, to methods and apparatus for accurately measuring power amplifier (PA) transmission power levels in an array antenna assembly, e.g., a phased array antenna assembly, including a plurality of power amplifiers, and controlling the transmission power in response to the measurements.

BACKGROUND

Because power amplifier (PA) performance may vary over time and temperature, cellular systems typically monitor the power output of the transmitter PA in order to ensure optimal power output and compliance with emission requirements. For 5G millimeter wave (MMW) systems, this process is complicated because there are generally many PA's per transmitter and the average power is time varying because of Time Division Duplex (TDD) operation. Additionally, a phase array antenna may utilize amplitude tapering in its antenna pattern which changes the power setting of different PAs within an antenna.

Based on the above discussion, there is a need for new methods and apparatus to accurately measure the transmission power levels in an antenna array assembly and to adjust gains to maintain transmission power target levels. It would be desirable if at least some of these new methods and apparatus take into account the effects of temperature variations due to ambient changes and/or due to variations within different parts of the antenna array assembly. It would be desirable if at least some of these new methods and apparatus take into account the effects of amplitude tapering.

SUMMARY

A communications device, e.g. an access point, includes an array antenna assembly, e.g., a phased array antenna assembly, the array antenna assembly includes one or more chips, e.g. front end IC chips, each front end IC chip including one or more transmit (TX) chains and a digital interface, e.g., a Serial Programmable Interface (SPI) interface. Each transmit chain includes a TX power amplifier (PA), power sensor, for measuring the transmit power of the TX PA, and an analog to digital converter (ADC) for obtaining a digital representation of the average transmit power over an orthogonal frequency-division multiplexing (OFDM) symbol duration. The communications device further includes a baseband transmitter including an interface, e.g., an SPI interface configured to act as a master with regard to the SPI interfaces of the one or more front end IC chips. The baseband transmitter determines that a predetermined symbol of interest in the communications protocol, e.g., a primary synchronization signal (PSS) symbol of a synchronization symbol block (SSB) will be transmitted and sends, e.g., using a broadcast address, a capture command to the front end IC chips. This command triggers capture of power measurements, in each of the chains of each of the chips, at the symbol boundary of the symbol of interest, along with capture of chip temperature sensor values. The captured values from ADCs are stored in registers on the chips, and subsequently communicated, e.g., sequentially, to the baseband transmitter, e.g., in response to SPI read register commands. The baseband transmitter processes the received measurements, e.g., taking into account temperature and amplitude taper, obtaining estimated individual transmit power levels, estimated chip transmit power levels, and/or an estimated aggregate array power level. The baseband transmitter determines errors from desired transmitter target levels, and determines adjustments, e.g. increase or decrease amounts with respect to individual gain elements in individual TX chains and/or with respect to one or more chips. The baseband transmitter communicates the adjustment information to the chips, which implement the adjustments, e.g. changing setting of adjustable gain elements in one or more transmit chains.

An exemplary method of operating a communication device in accordance with various embodiments, comprises: operating a baseband transmitter to determine, based on a timing structure of a communications protocol, when a predetermined symbol will be transmitted; operating the baseband transmitter to send a capture command to an address monitored by a serial programmable interface (SPI) interface of a first chip in a transmission array included in said communications device; and operating the first chip to capture one or more transmit power values, each of the one or more transmit power values being sensed at a point in time when an orthogonal frequency division multiplexing (OFDM) symbol boundary for the predetermined symbol is being output by the first chip to transmit antenna elements coupled to said first chip.

An exemplary communication device, in accordance with various embodiments, comprises a transmission array including one or more chips, said one or more chips including a first chip; and a baseband transmitter, said baseband transmitter including a first processor configured to: operate the baseband transmitter to determine, based on a timing structure of a communications protocol, when a predetermined symbol will be transmitted; and operate the baseband transmitter to send (712) a capture command to an address monitored by an SPI interface of a first chip in a transmission array included in said communications device; and wherein the first chip includes a second processor configured to: operate the first chip to capture one or more transmit power values, each of the one or more transmit power values being sensed at a point in time when an OFDM symbol boundary for the predetermined symbol is being output by the first chip to transmit antenna elements coupled to said first chip.

While various features discussed in the summary are used in some embodiments it should be appreciated that not all features are required or necessary for all embodiments and the mention of features in the summary should in no way be interpreted as implying that the feature is necessary or critical for all embodiments.

Numerous additional features and embodiments are discussed in the detailed description which follows.

DETAILED DESCRIPTION

Figure 1:
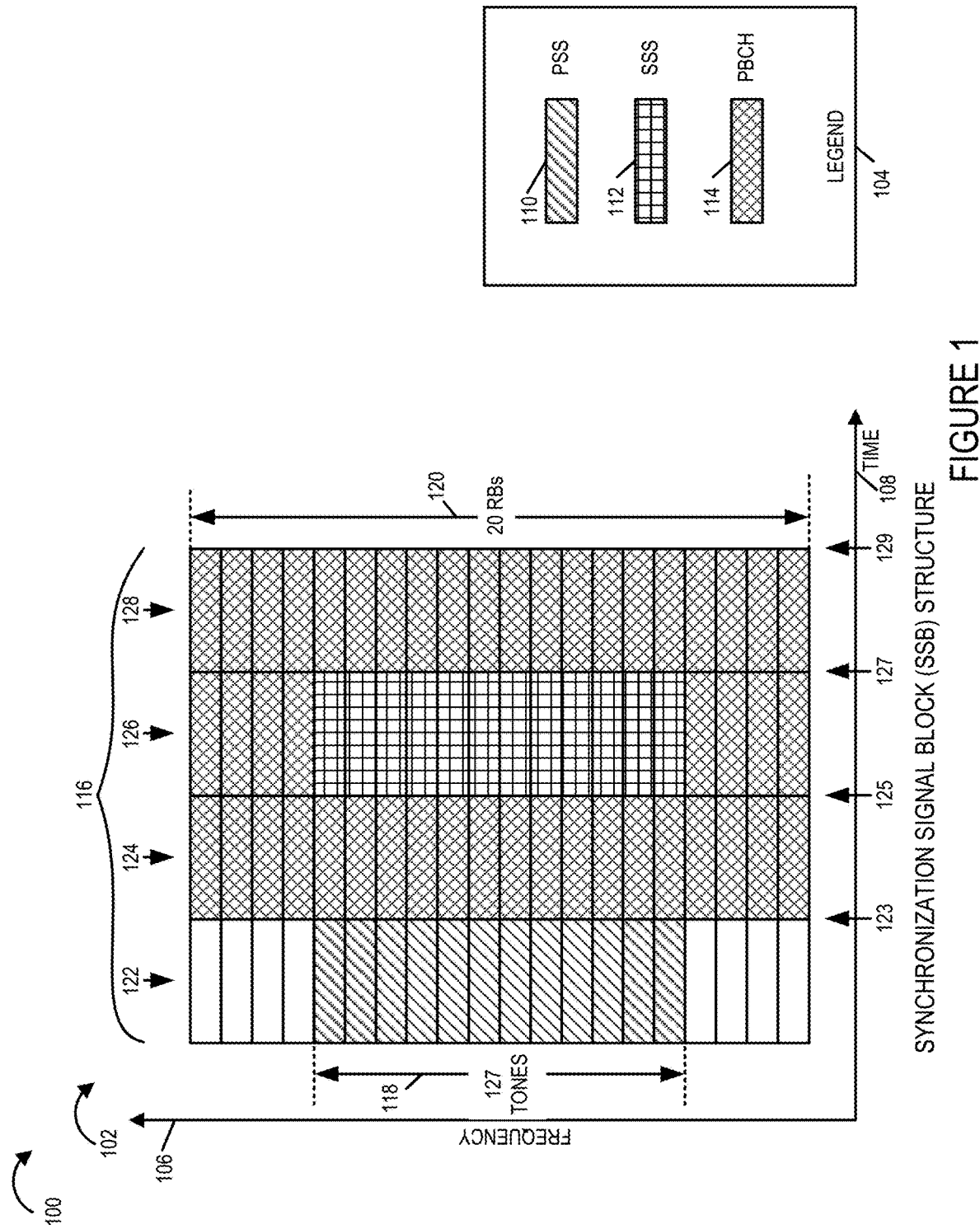
FIG. 1 is a drawing illustrating an exemplary Synchronization Signal Block (SSB) Structure.

In order to deal with the power variation due to Time Division Duplex (TDD) operation and loading, the power amplifier (PA) power should be measured at a specific time relative to the system protocol. For example, a base station will transmit a Synchronization Signal Block (SSB) periodically which is a known signal, independent of user data, which can be, and sometimes is, used as a reference for power measurement. In fifth generation New Radio (SGNR) the SSB includes four symbols. The SSB conveys primary synchronization signal (PSS), secondary synchronization signal (SSS) and primary broadcast channel (PBCH) signals. The primary synchronization signals convey a primary synchronization sequence. The secondary synchronization signals convey a secondary synchronization sequence. The structure of the SSB is shown in drawing 100 of FIG. 1.

Drawing 100 includes drawing 102 including an exemplary SSB block 116 and corresponding legend 104. Drawing 102 is a plot of frequency on the vertical axis 106 vs time on the horizontal axis 108, which illustrates the SSB block 116. The SSB block 116 includes PSS resource blocks (RBs) as indicated by slanted line shading 110, SSS resource blocks 112, as indicated by horizontal and vertical line shading, and PBCH resource blocks 114, as indicated by crosshatch shading 114. PSS and the SSS are each 127 tones wide, as indicated by arrow 118, while the maximum width of the SSB is 20 RBs wide, as indicated by arrow 120.

The first symbol 122 of the SSB 116 conveys the PSS signals. The second symbol 124 of the SSB 116 conveys PBCH signals. The third symbol 126 of the SSB 116 conveys SSS signals and PBCH signals. The fourth symbol 128 of the SSB 116 conveys PBCH signals. Symbol boundaries (123, 125, 127, 129) are also indicated in FIG. 1.

Figure 2:
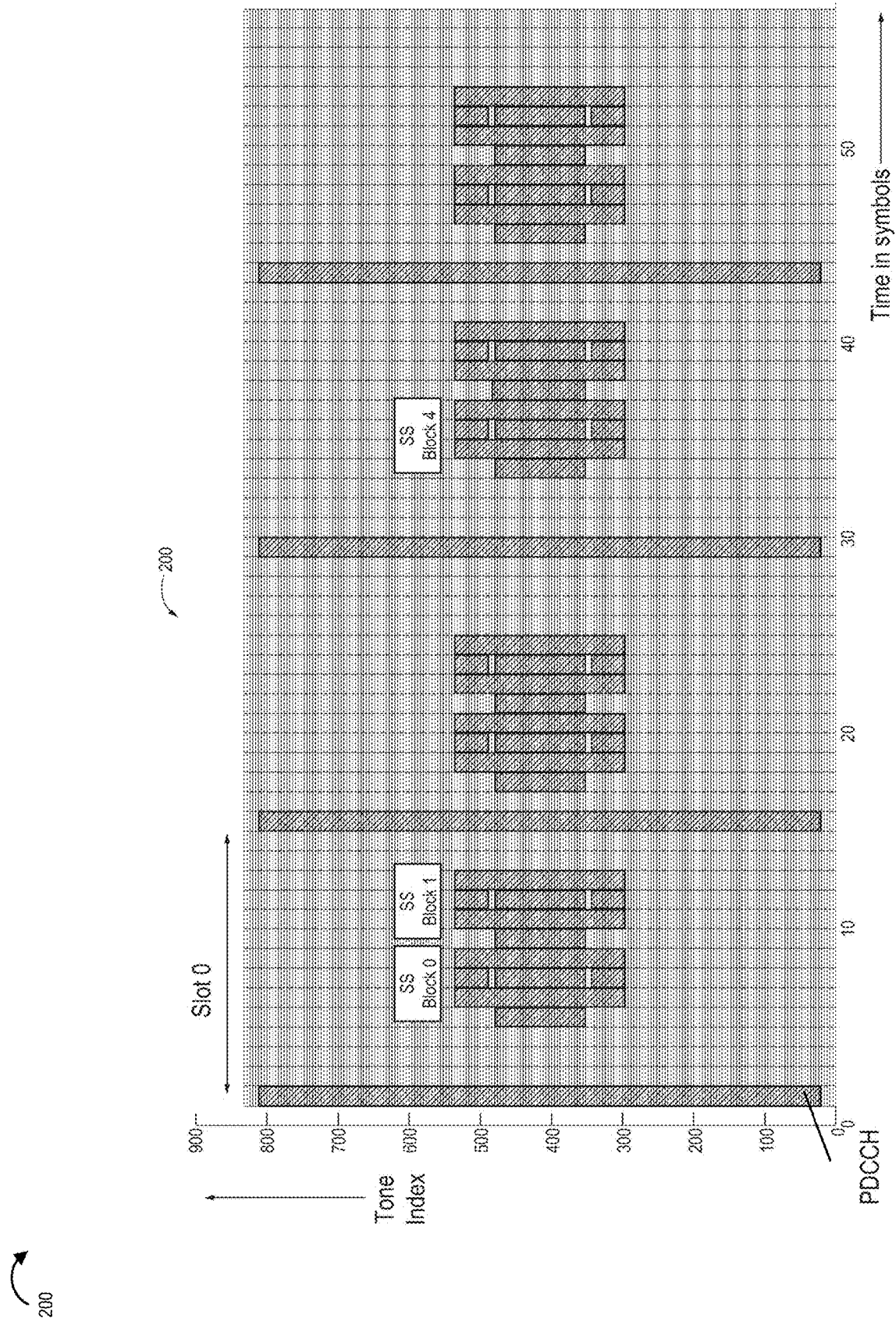
FIG. 2 is a drawing illustrating exemplary periodic allowable locations of SSBs within slots in a timing structure.
Figure 3:
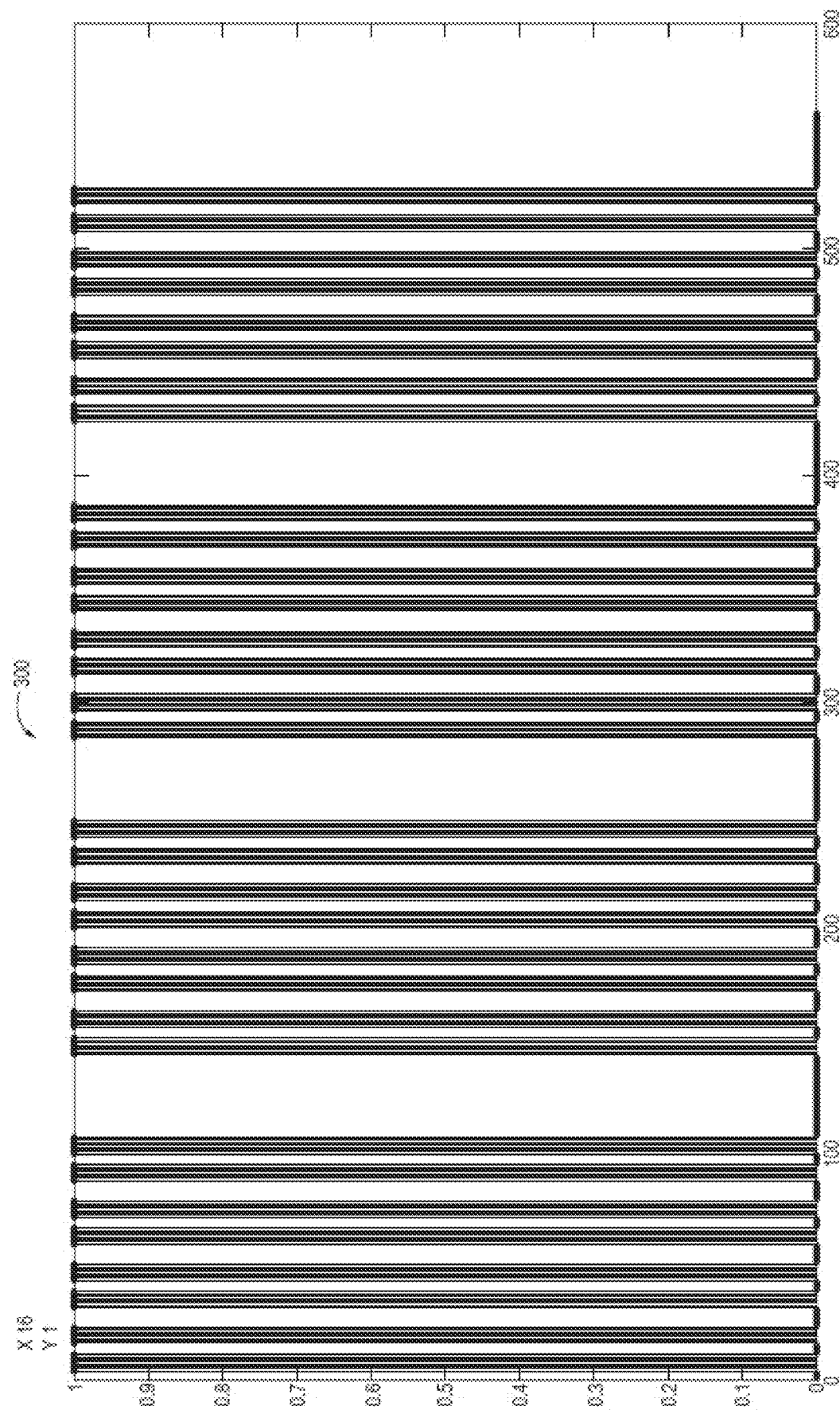
FIG. 3 is a drawing illustrating exemplary SSB locations within a half-frame of a timing structure.

Each of these signals (PSS, SSS, PBCH) occupy a predefined set of resource blocks (RBs) in the 5G channel and are transmitted with a specified average power. FIG. 2 is a drawing 200 which shows the periodical allowable locations of SSB blocks within a SGNR slot. FIG. 3 is a drawing 300 which shows the periodic allowable location of SSB blocks within a half-frame (over a 5 ms half-frame).

5G is an Orthogonal Frequency Division Multiplexing (OFDM) based transmission protocol which means that the underlying modulation is based on long-duration symbols (8.92 micro-sec for a subcarrier spacing of 120 kHz) generated by an inverse fast fourier transform (FFT) with a cyclic prefix inserted. The average power over the symbol duration depends on the information content of the symbols (i.e. SSB channels); however, the instantaneous power may vary widely within the symbol due to the modulation envelope which may have a peak to average power ratio exceeding 10 dB. Thus to accurately measure the power of a symbol the power measurement should be averaged over the symbol duration and sampled at the symbol boundary.

An exemplary system, e.g., a transmitter system, implemented in accordance with features of the present invention, includes functionality to average power over a symbol duration, and sample each of the power amplifier (PA) power detectors precisely synchronized to a specify symbol boundary in the transmission protocol. For example, one symbol is first symbol 122 of the SSB 116 conveying the PSS, and the symbol boundary is symbol boundary 123.

Figure 4:
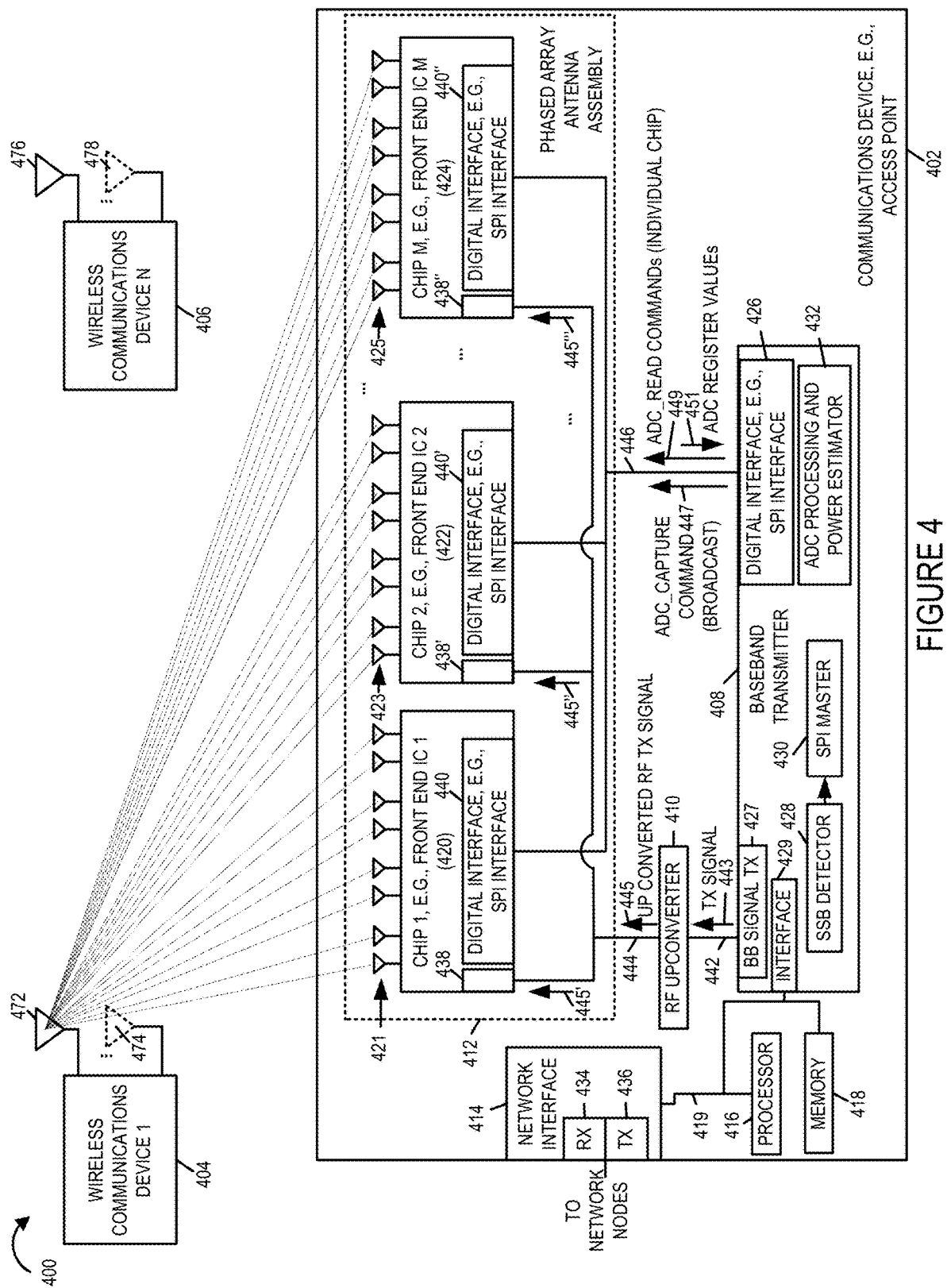
FIG. 4 illustrates an exemplary communications system including a communications device, e.g., an access point, including a phased antenna array assembly in accordance with an exemplary embodiment.

FIG. 4 is a drawing of an exemplary communications system 400 implemented in accordance with an exemplary embodiment. Exemplary communications system 400 includes a communications device 402, e.g., an access point including a transmitter system (e.g., a 5G transmitter system), and one or more wireless communications devices, e.g., user equipment (UE) devices (wireless communications device 1 404, . . . , wireless communications device N 406). The communications device 402 includes a baseband transmitter 408, a radio frequency (RF) upconverter 410, a phased array antenna assembly 412, a network interface 414, a processor 416, e.g., a CPU, and memory 418 coupled together as shown.

The phased antenna array assembly 412 includes one or more chips, e.g., front end chips (chip 1 420, e.g., front end integrated circuit (IC) 1 420, chip 2 422, e.g., front end integrated circuit (IC) 2 422, . . . , chip M 424, e.g., front end integrated circuit (IC) M 424. Each front end chip (420, 422, . . . , 424) includes a plurality of TX/RX front end elements, e.g., 4 Horizontal polarization (H-pol) TX/RX front end elements and 4 vertical polarization (V-Pol) TX/RX front ends elements, and each TX/RX front end element is coupled to an antenna element within the antenna array assembly 412. For example chip 1 420 is coupled to the set 421 of 8 antenna elements (4 H-pol antenna elements and 4 V-pol antenna elements); chip 2 422 is coupled to the set 423 of 8 antenna elements (4 H-pol antenna elements and 4V-pol antenna elements); and chip M 424 is coupled to the set 425 of 8 antenna elements (4 H-pol antenna elements and 4V-pol antenna elements).

Baseband transmitter 408 includes a digital interface 426, e.g., a serial programmable interface (SPI) 426, a SSB detector 428, a SPI master 430, and an analog to digital (ADC) processing and power estimator 432.

The network interface 416 includes a receiver 434 and a transmitter 436, e.g. for communicating with other network devices, a network, e.g., a backhaul network, and/or the Internet. The network interface 414, processor 416, memory 418 and the baseband transmitter 408 are coupled together via a bus 419 over which the various elements may interchange data and information. The digital interface 426, e.g., a SPI interface, of the baseband transmitter 408 is coupled to the digital interfaces, e.g., SPI interface(s) (440, 440', . . . , 440") of the chips (420, 422, . . . , 424), respectively of the phased array antenna assembly 412 via bus 446, e.g. SPI interface bus. The SPI interface 426 of the baseband transmitter 426 acts as a master with the SPI interfaces (440, 440', 440") of the front end chips (420, 422, 424) acting as slaves. An exemplary signal communicated over bus 446 include an ADC capture command 447, e.g., sent from the baseband transmitter 408 via its interface 426, as a broadcast command using a broadcast address, to the interfaces (440, 440', . . . 440") of chips (420, 422, . . . 424). Another exemplary signal communicated over bus 446 includes an ADC read command 449, e.g., sent from the baseband transmitter 408, via its interface 426, as a command directed to a chip address corresponding to one of the chips (420, 422, . . . 424) to read a register, e.g., one of 9 ADC registers storing one of a power measurement of a temperature measurement, on the chip. Another exemplary signal communicated over bus 446 includes an ADC register value signal 451, e.g., sent from one of the chips (420, 422, . . . 424), via its interface (440, 440' or 440"), to the interface 426 of baseband transmitter 408 in response to a received ADC read command.

SSB detector 428, monitors the protocol and, in response to a detected occurrence of a predetermined symbol of interest (for power measurement of the SSB) sends a signal to the SPI master 430, to generate and send an ADC capture command such that each chips (420, 422, . . . , 424) will capture a set of power measurements, e.g. a set of 8 power measurements, and a temperature measurement at the desired time, e.g. the end boundary of one of the symbols of the SSB, e.g. the end boundary of the symbol conveying the PSS. ADC processing and power estimator 432, processes the received power and temperature measurements from the chips (420, 422, . . . , 424), e.g., adjusting for temperature and power amplifier taper, sums power levels, compares results to target levels, determines errors and makes adjustments in response to determined errors, e.g., sends a signal to adjust, e.g., increase or decrease, one or more gains on one or more chips (420, 422, . . . 424).

Each of the wireless communications devices (wireless communications device 1 404, . . . , wireless communications device N 406) includes one or more antennas ((472, . . . , 474), . . . , (476, . . . , 478)), respectively. Set of lines 470 illustrates exemplary signaling from phased array antenna assembly 412 of communications device 402, e.g., an access point, to antenna 472 of wireless communications device 1 404.

Interface 429 of baseband transmitter 408 includes a transmitter and a receiver and couples the baseband transmitter 408 to internal communications device bus 419. Baseband signal transmitter 488 of the baseband transmitter 408, generates and outputs a baseband transmission signal 443, which is sent to RF upconverter 410, which receives baseband signal 443 and generates an UP converted RF signal 445, e.g., a millimeter wave signal, which is fed as an input signal via connection(s) and/or distribution circuitry 444, to each of the chips (420, 422, . . . 424) of the antenna array assembly 412. Chip 1 420 receives the distributed signal 445, as input signal 445' via its RF input connection 438. Chip 2 422 receives the distributed signal 445, as input signal 445" via its RF input connection 438'. Chip M 424 receives the distributed signal 445, as input signal 445"" via its RF input connection 438". The input signal 445 may, and sometimes does, include symbols of the SSB. The ADC capture command 447 is sent by the baseband transmitter 408 at the appropriate time, e.g. in accordance with the ADC capture transaction timing, such that each of the chips (420, 422, . . . , 424) is controlled to capture ADC values of filtered transmission power measurements of their power amplifiers and a temp sensor value concurrently, at the boundary (end) of the OFDM symbol of interest, e.g. boundary of PSS SSB symbol. In various embodiments, a captured ADC value represents an average power of the PA over the symbol or a temperature measurement. The captured power measurements are stored in registers on the chip and subsequently reported to the baseband transmitter, e.g. sequentially, in response to register read commands. The ADC processing and power estimator 432 processes the reported power measurements and temperatures, and compares the processed results to target transmission power levels, e.g., determining errors, and making adjusting to gain elements in chips to change, e.g. increase or decrease, TX power levels.

Figure 5:
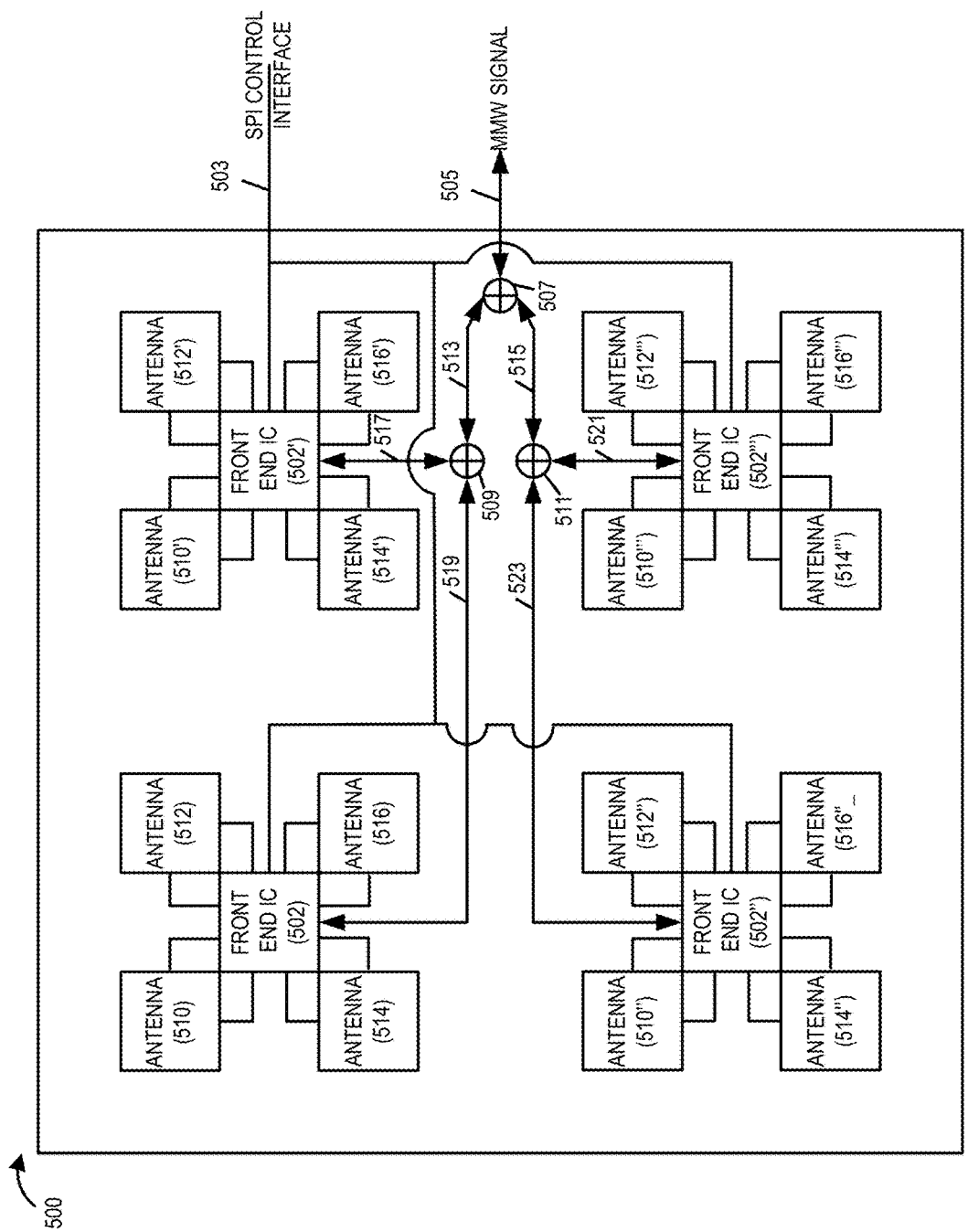
FIG. 5 illustrates an exemplary millimeter wave phased array antenna assembly in accordance with an exemplary embodiment.

FIG. 5 is a drawing of an exemplary millimeter wave phase array antenna assembly 500 in accordance with an exemplary embodiment. Phased array antenna assembly 500 of FIG. 5 is, e.g., one implementation of phased array antenna assembly 412 of communications device 400 of FIG. 4, where M=4. Phased array antenna assembly 500 is constructed out of a number of front end ICs (502, 502', 502", 502''') as shown in FIG. 5. In the example of FIG. 5, each of the front end ICs ((502, 502', 502", 502''') includes 4 horizontal polarization TX/RX front end elements (modules or chains) and 5 vertical polarization front end elements (modules or chains), and each front end element is coupled to an antenna element. Front end IC 502 is, e.g., chip 1 402; front end IC 502' is, e.g., chip 2 422; and front end IC 502''' is, e.g., chip M 424.

Front end IC 502 is coupled to antennas (510, 512, 514, 516). Each antenna (510, 512, 514, 516) includes a H-pol antenna element and a V-pol antenna element. A first H-pol RX/TX front end element of front end IC 502 is coupled to a H-pol antenna element of antenna 510. A first V-pol RX/TX front end element of front end IC 502 is coupled to a V-pol antenna element of antenna 510. A second H-pol RX/TX front end element of front end IC 502 is coupled to a H-pol antenna element of antenna 512. A second V-pol RX/TX front end element of front end IC 502 is coupled to a V-pol antenna element of antenna 512. A third H-pol RX/TX front end element of front end IC 502 is coupled to a H-pol antenna element of antenna 514. A third V-pol RX/TX front end element of front end IC 502 is coupled to a V-pol antenna element of antenna 514. A fourth H-pol RX/TX front end element of front end IC 502 is coupled to a H-pol antenna element of antenna 516. A fourth V-pol RX/TX front end element of front end IC 502 is coupled to a V-pol antenna element of antenna 516.

Similarly, front end IC 502' is coupled to antennas (510', 512', 514', 516'). Each antenna (510', 512', 514', 516') includes a H-pol antenna element and a V-pol antenna element. A first H-pol RX/TX front end element of front end IC 502' is coupled to a H-pol antenna element of antenna 510'. A first V-pol RX/TX front end element of front end IC 502' is coupled to a V-pol antenna element of antenna 510'. A second H-pol RX/TX front end element of front end IC 502' is coupled to a H-pol antenna element of antenna 512'. A second V-pol RX/TX front end element of front end IC 502' is coupled to a V-pol antenna element of antenna 512'. A third H-pol RX/TX front end element of front end IC 502' is coupled to a H-pol antenna element of antenna 514'. A third V-pol RX/TX front end element of front end IC 502' is coupled to a V-pol antenna element of antenna 514'. A fourth H-pol RX/TX front end element of front end IC 502' is coupled to a H-pol antenna element of antenna 516'. A fourth V-pol RX/TX front end element of front end IC 502' is coupled to a V-pol antenna element of antenna 516'.

Similarly, front end IC 502" is coupled to antennas (510", 512", 514", 516"). Each antenna (510", 512", 514", 516") includes a H-pol antenna element and a V-pol antenna element. A first H-pol RX/TX front end element of front end IC 502" is coupled to a H-pol antenna element of antenna 510". A first V-pol RX/TX front end element of front end IC 502" is coupled to a V-pol antenna element of antenna 510". A second H-pol RX/TX front end element of front end IC 502" is coupled to a H-pol antenna element of antenna 512". A second V-pol RX/TX front end element of front end IC 502" is coupled to a V-pol antenna element of antenna 512". A third H-pol RX/TX front end element of front end IC 502" is coupled to a H-pol antenna element of antenna 514". A third V-pol RX/TX front end element of front end IC 502" is coupled to a V-pol antenna element of antenna 514". A fourth H-pol RX/TX front end element of front end IC 502" is coupled to a H-pol antenna element of antenna 516". A fourth V-pol RX/TX front end element of front end IC 502" is coupled to a V-pol antenna element of antenna 516".

Similarly, front end IC 502' is coupled to antennas (510''', 512''', 514''', 516'''). Each antenna (510''', 512''', 514''', 516''') includes a H-pol antenna element and a V-pol antenna element. A first H-pol RX/TX front end element of front end IC 502' is coupled to a H-pol antenna element of antenna 510'''. A first V-pol RX/TX front end element of front end IC 502''' is coupled to a V-pol antenna element of antenna 510'''. A second H-pol RX/TX front end element of front end IC 502''' is coupled to a H-pol antenna element of antenna 512'''. A second V-pol RX/TX front end element of front end IC 502''' is coupled to a V-pol antenna element of antenna 512'''. A third H-pol RX/TX front end element of front end IC 502''' is coupled to a H-pol antenna element of antenna 514'''. A third V-pol RX/TX front end element of front end IC 502''' is coupled to a V-pol antenna element of antenna 514'''. A fourth H-pol RX/TX front end element of front end IC 502''' is coupled to a H-pol antenna element of antenna 516'''. A fourth V-pol RX/TX front end element of front end IC 502''' is coupled to a V-pol antenna element of antenna 516'''.

The millimeter wave phase array 500 includes a SPI control interface bus 503, which is coupled to the SPI interfaces of each of the front end IC chips (502, 502' 502", 502'''). The SPI interface 426 of the baseband transmitter 408, acting as a master, is coupled to the SPI interface bus 503.

The millimeter wave phase array 500 further includes millimeter wave signal line 505, which receives RF signals from an RF upconverter, e.g., Up converted RF TX signal 445 from RF upconverter 410 of FIG. 4. The phased array antenna assembly 500 further includes distributers/combiners (507, 509, 511). An upconverted RF TX signal, received on line 505 is distributed to each of the front end IC chips (502, 502', 502", 502'''). The received upconverted RF TX signal is conveyed to front end IC 502 via line 505, distribution element 507, line 513, distribution element 509, and line 519. The received upconverted RF TX signal is conveyed to front end IC 502' via line 505, distribution element 507, line 513, distribution element 509, and line 517. The received upconverted RF TX signal is conveyed to front end IC 502" via line 505, distribution element 507, line 515, distribution element 511, and line 523. The received upconverted RF TX signal is conveyed to front end IC 502''' via line 505, distribution element 507, line 515, distribution element 511, and line 521.

Figure 6:
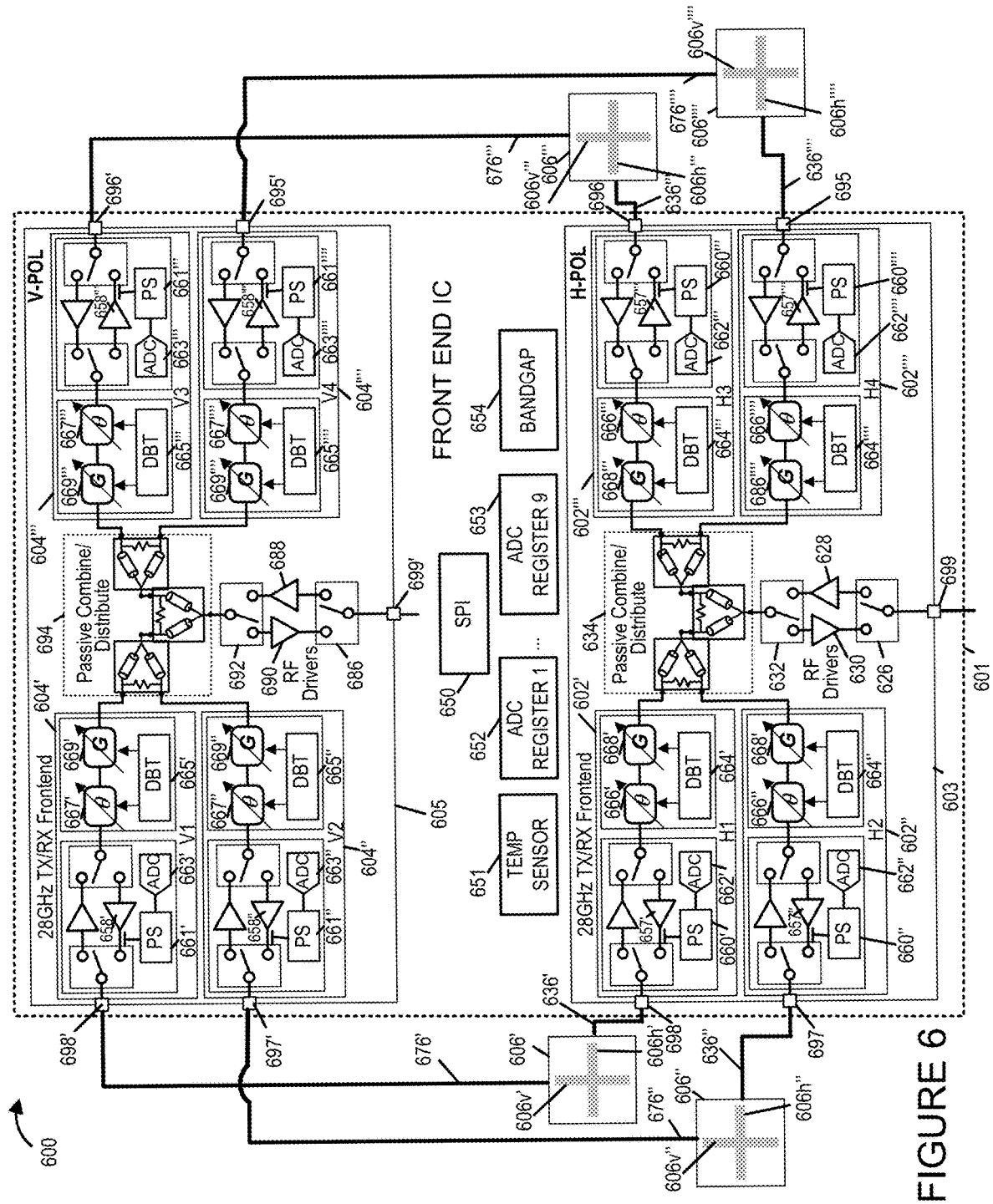
FIG. 6 illustrates exemplary front end integrated circuit (IC) architecture in accordance with an exemplary embodiment.

FIG. 6 illustrates exemplary front end integrated circuit (IC) architecture 600 in accordance with an exemplary embodiment. Exemplary front end integrated circuit (IC) architecture 600 may represent any of: i) front end IC 502 coupled to antennas (510, 512, 514, 516), ii) front end IC 502' coupled to antennas (510', 512', 514', 516'), iii) front end IC 502" coupled to antennas (510", 512", 514", 516"), iv) front end IC 502''' coupled to antennas (510''', 512''', 514''', 516'''), v) chip 420 coupled to antenna element set 421, vi) chip 2 422 coupled to antenna element set 423, or vi) chip M 424 coupled to antenna element set 425.

Exemplary front end integrated circuit architecture 600 includes a front end IC chip 601 coupled to a plurality of antennas (antenna 1 606', antenna 2 606", antenna 3 606''', antenna 4 606''''). Each antenna (antenna 1 606', antenna 2 606", antenna 3 606''', antenna 4 606'''') includes a horizontal polarization antenna element and a vertical polarization antenna element ((606h', 606v'), (606h", 606v"), (606h''', 606v'''), (606h'''', 606v''''), respectively. Thus 4 horizontal polarization transmit/receive chains and 4 vertical polarization transmit/receive chains are shown. Based on control signaling, in accordance with a timing structure protocol being used, the 8 TX/RX chains are controlled to operate concurrently as TX chains during predetermined time intervals during which known signals, e.g. SSB signals are transmitted.

Exemplary front end IC chip 601 includes horizontal polarization (H-POL) TX/RX circuitry 603, vertical polarization (V-POL) circuitry 605, a serial programmable interface (SPI) 650, a temperature sensor 651, a set of 9 analog to digital converter (ADC) registers (ADC register 1 652, . . . , ADC register 9 653), and bandgap information 654.

The horizontal polarization (H-POL) TX/RX circuitry 603 includes 4 TX/RX Frontend elements, sometimes referred to as circuits, modules or chains, (TX/RX Frontend H1 602', TX/RX Frontend H2 602", TX/RX Frontend H3 602', TX/RX Frontend H4 602"), passive combine/distribute circuitry 634, TX/RX switches 632, 626, and RF drivers 630, 628 coupled together as shown.

TX/RX Frontend H1 602' includes an adjustable gain element 668', an adjustable phase element 666', a digital beam table 664', controllable TX/RX switches, a receive chain received signal amplifier, a transmit chain power amplifier 657', a power sensor (PS) 660' and an analog to digital converter (ADC) 662'. TX/RX Frontend H2 602" includes an adjustable gain element 668", an adjustable phase element 666", a digital beam table 664", controllable TX/RX switches, a receive chain received signal amplifier, a transmit chain power amplifier 657", a power sensor (PS) 660" and an analog to digital converter (ADC) 662". TX/RX Frontend H3 602''' includes an adjustable gain element 668', an adjustable phase element 666''', a digital beam table 664''', controllable TX/RX switches, a receive chain received signal amplifier, a transmit chain power amplifier 657''', a power sensor (PS) 660''' and an analog to digital converter (ADC) 662'''. TX/RX Frontend H4 602'''' includes an adjustable gain element 668'''', an adjustable phase element 666'''', a digital beam table 664'''', controllable TX/RX switches, a receive chain received signal amplifier, a transmit chain power amplifier 657'''', a power sensor (PS) 660'''' and an analog to digital converter (ADC) 662'''.

The vertical polarization (V-POL) TX/RX circuitry 605 includes 4 TX/RX Frontend elements, sometimes referred to as circuits, modules or chains, (TX/RX Frontend V1 604', TX/RX Frontend V2 604", TX/RX Frontend V3 604''', TX/RX Frontend V4 604''''), passive combine/distribute circuitry 694, TX/RX switches 686, 692, and RF drivers 688, 690 coupled together as shown.

TX/RX Frontend V1 604' includes an adjustable gain element 669', an adjustable phase element 667', a digital beam table 665', controllable TX/RX switches, a receive chain received signal amplifier, a transmit chain power amplifier 658', a power sensor (PS) 661' and an analog to digital converter (ADC) 663'. TX/RX Frontend V2 604" includes an adjustable gain element 669", an adjustable phase element 667", a digital beam table 665", controllable TX/RX switches, a receive chain received signal amplifier, a transmit chain power amplifier 658", a power sensor (PS) 661" and an analog to digital converter (ADC) 663". TX/RX Frontend V3 604''' includes an adjustable gain element 669''', an adjustable phase element 667''', a digital beam table 665''', controllable TX/RX switches, a receive chain received signal amplifier, a transmit chain power amplifier 658''', a power sensor (PS) 661''' and an analog to digital converter (ADC) 663'''. TX/RX Frontend V4 604'''' includes an adjustable gain element 669'''', an adjustable phase element 667'''', a digital beam table 665'''', controllable TX/RX switches, a receive chain received signal amplifier, a transmit chain power amplifier 658'''', a power sensor (PS) 661'''' and an analog to digital converter (ADC) 663''''.

Drawing 600 will now be described with respect to transmission. The various TX/RX switches 626, 632, 686, 692 and the TX/RX switches within the TX/RX frontends (602', 602", 602''', 602'''', 604', 604", 604''', 604'''') are set, e.g., controlled, to be in TX mode. Thus each TX/RX chain (602', 602", 602''', 602'''', 604', 604", 604''', 604'''') can be considered to be operating as a transmit (TX) chain. An upconverted RF signal is received on terminals (699, 699'), which are coupled together or are a single input terminal, e.g. depending upon the implementation.

The received upconverted RF signal goes through switch 626, RF driver 628, switch 632, passive combine/distribute circuit 634, and is distributed as input to each of the H-pol frontends (602', 602", 602''', 602''''). With regard to frontend H1 602', the received upconverted RF signal is gain adjusted by gain element 668' and phase adjusted by phase element 666', and then the gain/phase adjusted signal is amplified by power amplifier 657' and output for transmission via output terminal 698 and lead 636' to horizontal polarization antenna element 606$h$' of antenna 606'. With regard to frontend H2 602", the received upconverted RF signal is gain adjusted by gain element 668" and phase adjusted by phase element 666", and then the gain/phase adjusted signal is amplified by power amplifier 657" and output for transmission via output terminal 697 and lead 636" to horizontal polarization antenna element 606$h$" of antenna 606". With regard to frontend H3 602''', the received upconverted RF signal is gain adjusted by gain element 668''' and phase adjusted by phase element 666''', and then the gain/phase adjusted signal is amplified by power amplifier 657''' and output for transmission via output terminal 696 and lead 636''' to horizontal polarization antenna element 606$h$''' of antenna 606'''. With regard to frontend H4 602'''', the received upconverted RF signal is gain adjusted by gain element 668'''' and phase adjusted by phase element 666'''', and then the gain/phase adjusted signal is amplified by power amplifier 657'''' and output for transmission via output terminal 695 and lead 636'''' to horizontal polarization antenna element 606$h$'''' of antenna 606''''.

The received upconverted RF signal goes through switch 686, RF driver 688, switch 692, passive combine/distribute circuit 694, and is distributed as input to each of the V-pol frontends (604', 604", 604''', 604''''). With regard to frontend V1 604', the received upconverted RF signal is gain adjusted by gain element 669' and phase adjusted by phase element 667', and then the gain/phase adjusted signal is amplified by power amplifier 658' and output for transmission via output terminal 698' and lead 676' to vertical polarization antenna element 606$v$' of antenna 606'. With regard to frontend V2 604", the received upconverted RF signal is gain adjusted by gain element 669" and phase adjusted by phase element 667", and then the gain/phase adjusted signal is amplified by power amplifier 658" and output for transmission via output terminal 697' and lead 676" to vertical polarization antenna element 606$v$" of antenna 606". With regard to frontend V3 604''', the received upconverted RF signal is gain adjusted by gain element 669''' and phase adjusted by phase element 667''', and then the gain/phase adjusted signal is amplified by power amplifier 658''' and output for transmission via output terminal 696' and lead 676''' to vertical polarization antenna element 606$v$''' of antenna 606'''. With regard to frontend V4 604'''', the received upconverted RF signal is gain adjusted by gain element 669'''' and phase adjusted by phase element 667'''', and then the gain/phase adjusted signal is amplified by power amplifier 658'''' and output for transmission via output terminal 695' and lead 676'''' to vertical polarization antenna element 606$v$'''' of antenna 606''''.

The SPI 650, which is coupled to the SPI of the baseband transmitter, receives an ADC capture command, e.g., an ADC capture command sent to a broadcast address, e.g., from a SPI interface of a baseband transmitter, which acts as a master, and in response, the SPI 650 controls front end IC chip 601 to perform a synchronous capture of ADC values from ADCs (662', 662", 662''', 662'''', 663', 663", 663''', 663''''), e.g., at the boundary (end) of a predetermined symbol, e.g. a SSB symbol such as a PSS symbol. In various embodiments, each of captured ADC values (662', 662", 662''', 662'''', 663', 663", 663''', 663'''') represent an average transmit power of the power amplifier (657', 657", 657''', 657'''', 658', 658", 658''', 658'''') over the symbol, e.g., based on measurements of power sensors (660', 660", 660''', 660'''', 661', 661", 661''', 661''''), respectively, and using filters set to correspond to the symbol duration. In addition a measurement of temperature sensor 651 is captured with the power measurements. The results of the captured 8 transmit power measurements and the 1 temperature measurement are stored in 9 ADC registers (ADC register 1 652, . . . , ADC register 9 653). Subsequently, SPI 650 receives, e.g., from the SPI of the baseband transmitter acting as a master, a sequence of 9 read commands, addressed to the chip ID of front end IC chip 601, each command requesting to read one of the 9 ADC registers (652, . . . , 653), and in response to each read command, the SPI 650 sends a stored value of the requested ADC register.

Figure 7A:
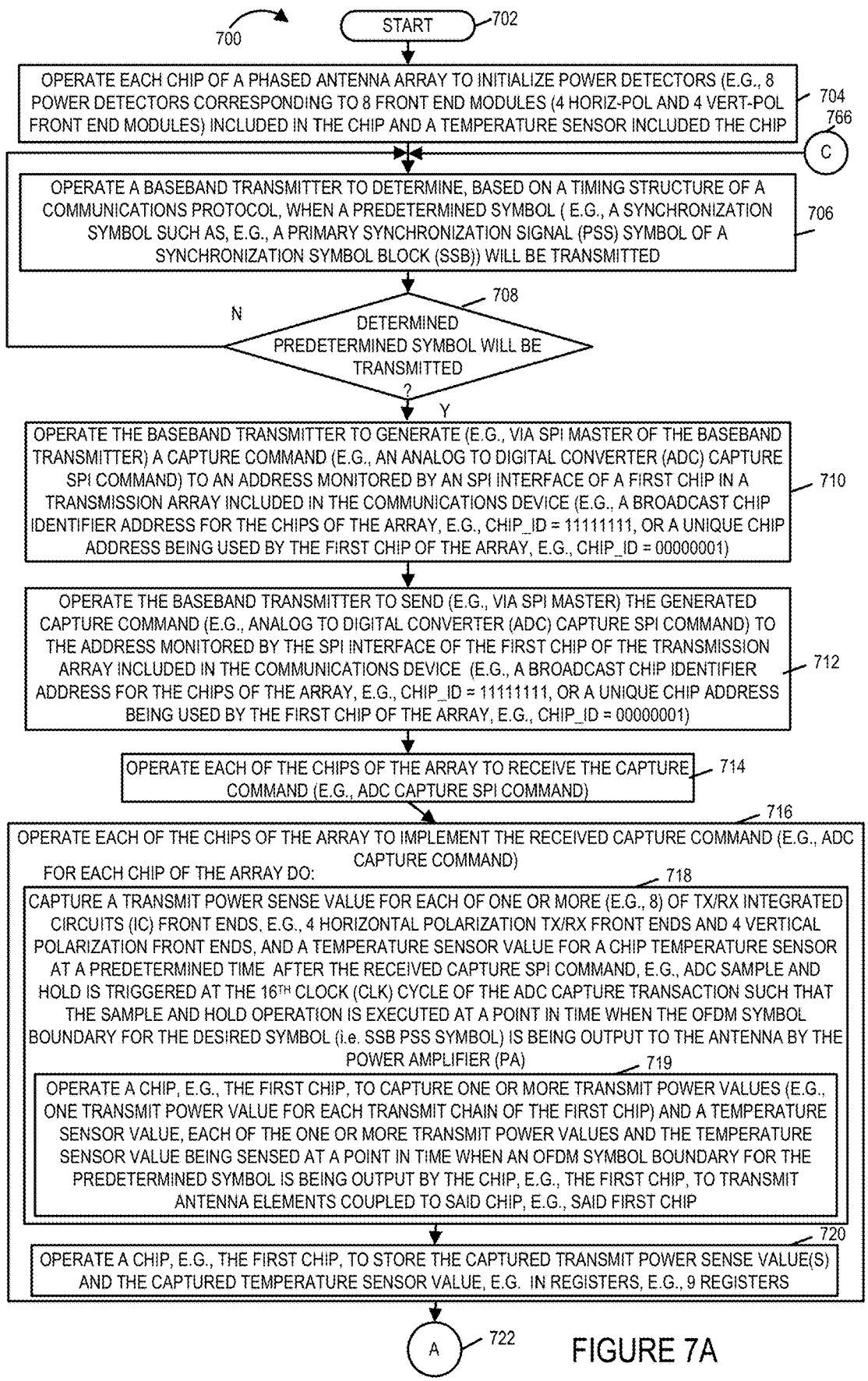
FIG. 7A is a first part of a flowchart of an exemplary method of operating a communications device in accordance with an exemplary embodiment.
Figure 7B:
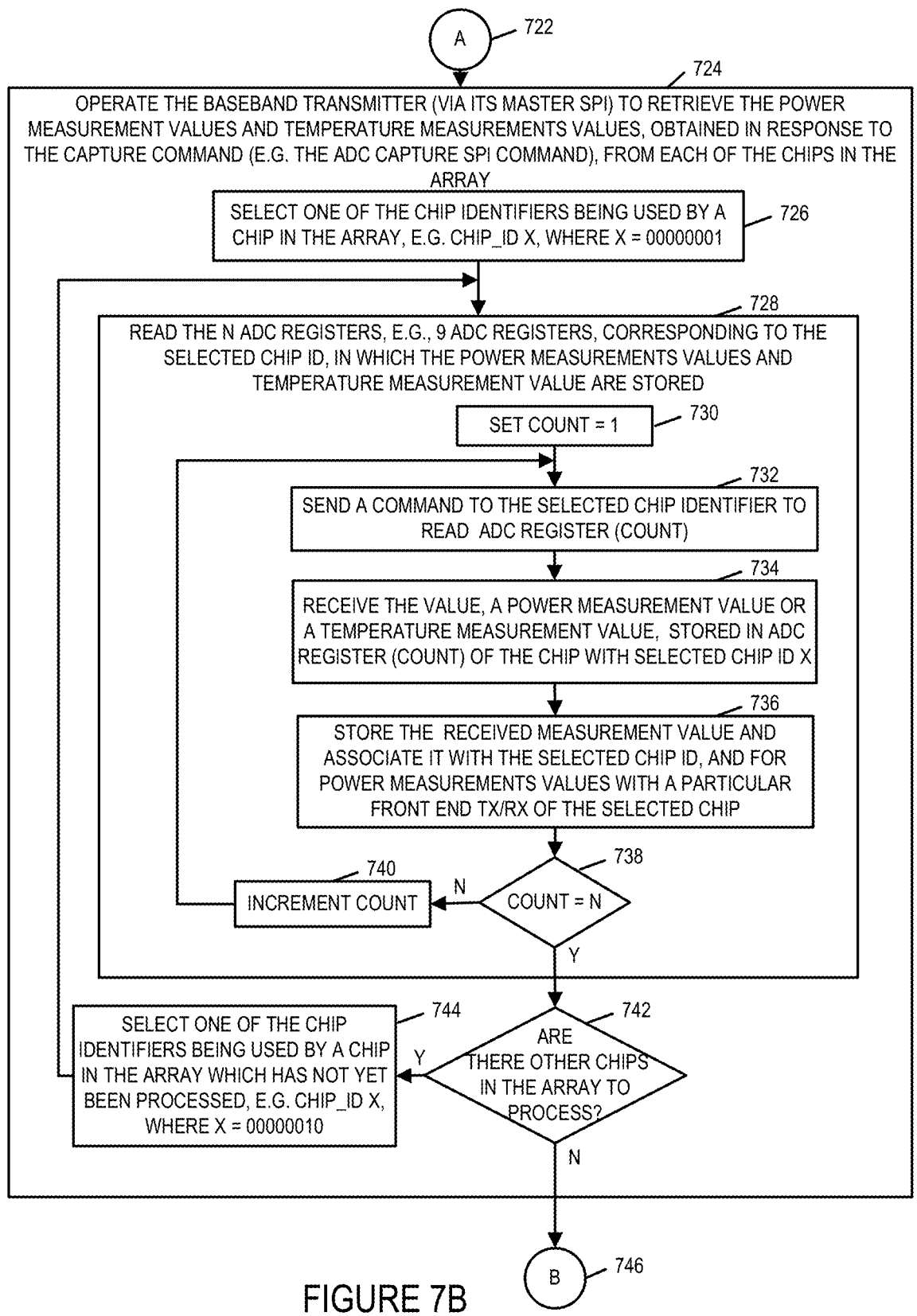
FIG. 7B is a second part of a flowchart of an exemplary method of operating a communications device in accordance with an exemplary embodiment.
Figure 7C:
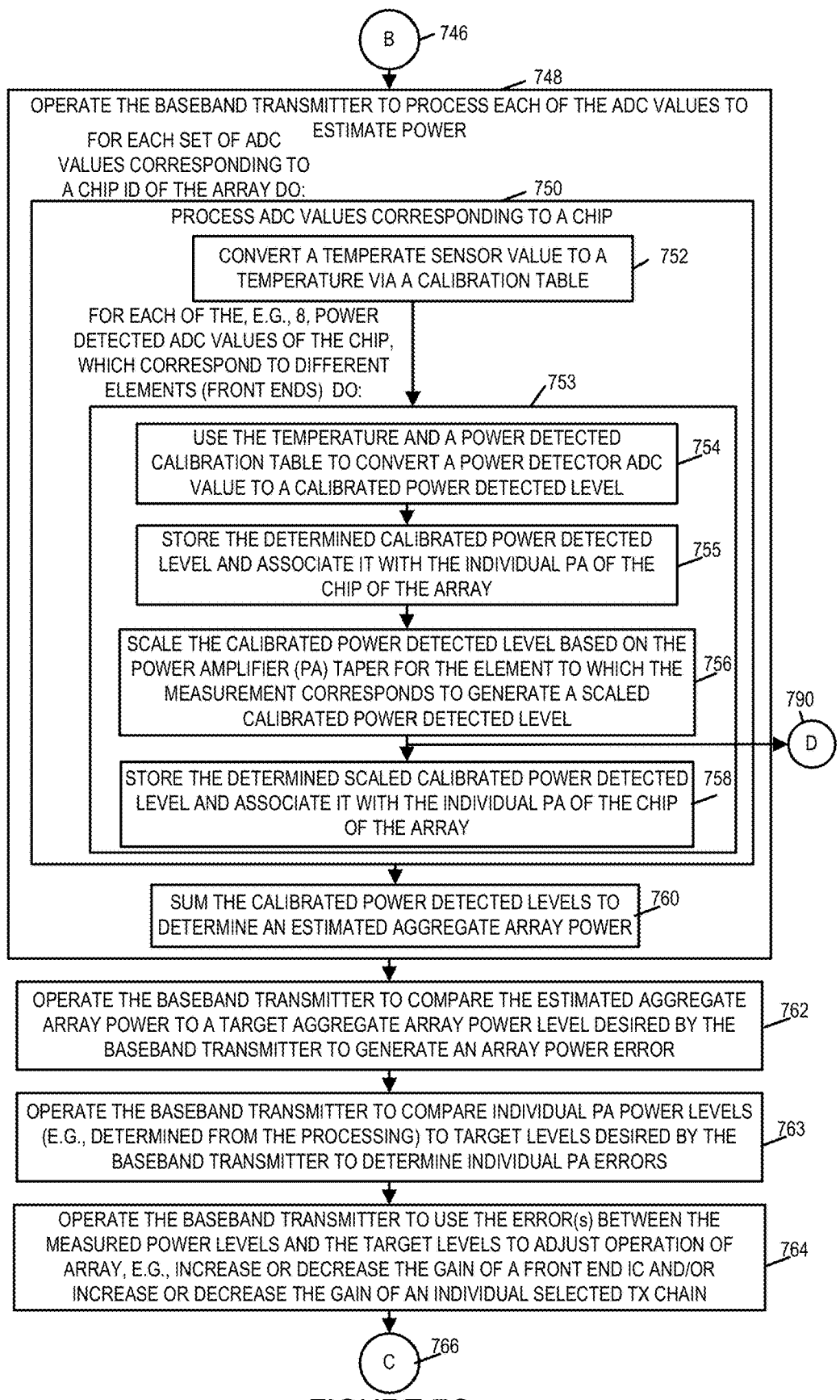
FIG. 7C is a third part of a flowchart of an exemplary method of operating a communications device in accordance with an exemplary embodiment.
Figures 7, 7D:
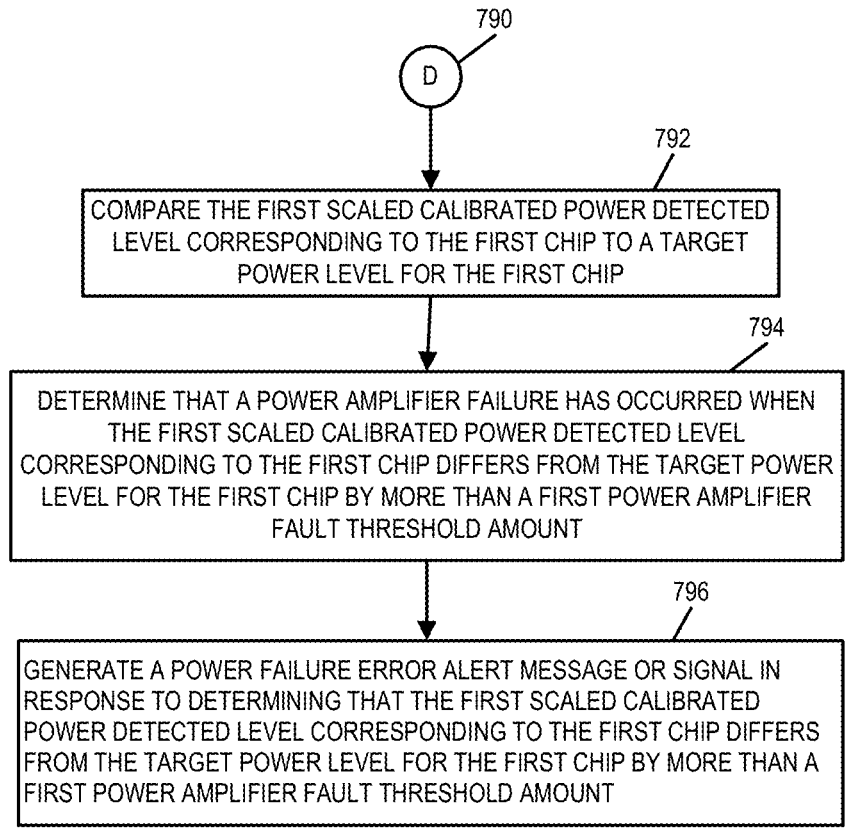
FIG. 7D is a fourth part of a flowchart of an exemplary method of operating a communications device in accordance with an exemplary embodiment.
FIG. 7 comprises the combination of FIG. 7A, FIG. 7B, FIG. 7C and FIG. 7D.

FIG. 7, comprising the combination of FIG. 7A, FIG. 7B and FIG. 7C, is a flowchart 700 of an exemplary method of operating a communications device in accordance with an exemplary embodiment. The communications device is, e.g., an access point, e.g. access point 402 of FIG. 4, including a baseband transmitter and a phased array antenna assembly including one or more front end IC chips, each front end IC chip including a plurality of TX/RX front ends and a plurality of corresponding antenna elements.

Operation starts in step 702, in which the communications device is powered on and initialized, and proceeds to step 704. In step 704 each chip of a phased array antenna assembly is operated to initialize power detectors, e.g., 8 power detectors corresponding to 8 front end modules (4 horizontal-polarization TX/RX front end modules and 4 vertical-polarization front end modules) included in the chip and a temperature sensor included in the chip. Operation proceeds from step 704 to step 706.

In step 706, the baseband transmitter is operated to determine, based on a timing structure of a communications protocol, when a predetermined symbol, e.g. a synchronization symbol such as a primary synchronization signal (PSS) symbol of a synchronization symbol block (SSB) will be transmitted. Operation proceeds from step 706 to step 708. In step 708, if the determination is that the predetermined symbol will not be transmitted, then operation proceeds from step 708 to the input of step 706 for another determination at a later time. However, if the determination is that the predetermined symbol will be transmitted, then operation proceeds from step 708 to step 710. In step 710 the baseband transmitter generates, e.g. via a serial programmable interface (SPI) master of the baseband transmitter, a capture command, e.g. an analog to digital converter (ADC) capture SPI command, to an address monitored by an SPI interface of a first chip in a transmission array included in the communications device (e.g., a broadcast chip identifier address for the chips of the array, e.g., CHIP_ID=11111111 or a unique chip address being used by the first chip of the array, e.g., CHIP_ID=00000001. For example, in an exemplary embodiment in which the phased antenna array includes a plurality of front end IC chips (e.g., with each front end IC chip including a plurality of front end TX/RX chains) the broadcast address is used and is monitored by each of the IC chips of the array. In another exemplary embodiment in which the phased antenna array includes a single IC front end chip with a plurality of front end TX/RX chains, e.g., 8 TX/RX chains, the unique chip address of the single front end IC chip, may be used or the broadcast address may be used. Operation proceeds from step 710 to step 712.

In step 712 the baseband transmitter is operated to send (e.g., via the SPI master of the baseband transmitter) the generated capture command (e.g. ADC capture SPI command) to the address monitored by the SPI interface of the first chip of the transmission array included in the communications device (e.g., a broadcast chip identifier address for the chips of thee array, e.g., CHIP_ID=11111111, or a unique chip address being used by the first chip of the array, e.g., CHIP_ID=00000001). In the case where the antenna array includes a plurality of IC front end chips, the broadcast address is used and the capture command is send to each of the IC front end chips including the first chip of the array. Operation proceeds from step 712 to step 714.

In step 714, each of the chips of the array is operated to receive the capture command, e.g., the ADC capture SPI command. Operation proceeds from step 714 to step 716. In step 716 each of the chips of the array is operated to implement the capture command (e.g., the ADC capture command). Step 716 includes step 718 and 720, which are performed by each chip of the array, e.g., in parallel. In step 718 the chip, e.g., IC front end chip, of the antenna array assembly is operated to capture a transmit power sense value for each of one more (e.g., 8) of TX/RX integrated circuit (IC) front ends (e.g., 4 horizontal polarization front ends and 4 vertical polarization front ends) and a temperature sensor value for a chip temperature sensor at a predetermined time after the received capture SPI command. For example, ADC sample and hold is triggered at the 16th clock (CLK) cycle of the ADC capture transaction such that the sample and hold operation is executed at a point in time when the OFDM symbol boundary for the desired symbol, e.g., SSB PSS symbol) is being output to the antenna by the power amplifier (PA). Step 718 includes step 719 in which a chip, e.g., the first chip of the antenna array assembly, is operated to capture one or more transmit power values (e.g., one transmit power value for each transmit chain of the first chip) and a temperature sensor value, each of the one or more transmit power values and the temperature sensor values being sensed at a point in time when an OFDM symbol boundary for the predetermined symbol is being output by the chip, e.g., the first chip, to transmit antenna elements couple to said chip. Operation proceeds from step 718 to step 720. In step 720 a chip, e.g. the first chip, is operated to store the captured transmit power sense value(s) (e.g., 8 values) and captured temperate sensor value, e.g. in registers, e.g., in 9 registers include in the chip. Operation proceeds from step 716, via connecting node A 722, to step 724.

In step 724, the baseband transmitter is operated to retrieve, e.g., via its master SPI, the power measurement values and temperature measurement values, obtained in response to the capture command (e.g., the ADC captured SPI command), from each of the chips in the antenna array assembly. Step 724 includes step 726, step 728, step 742 and step 744. In step 726 the baseband transmitter selects one of the chip identifiers being used by a chip in the array (for SPI addressing), e.g., CHIP_ID X, where X=00000001. Operation proceeds from step 726 to step 728.

In step 728 the baseband transmitter, e.g. via its SPI interface, reads N ADC registers, e.g., 9 ADC registers, corresponding to the selected chip ID, in which the power measurement values and temperature measurement value are stored. Step 728 includes steps 730, 732, 734, 736, 738 and 740. In step 730 the baseband transmitter sets COUNT=1, where COUNT is an index value used to cycle through a set of ADC registers. Operation proceeds from step 730 to step 732. In step 732 the baseband transmitter sends (via its SPI interface) a command (e.g., via a unicast address) to the selected chip identifier to read the ADC register (COUNT). Operation proceeds from step 732 to step 734. In step 734 the baseband transmitter receives (via its SPI interface) the value, which is a power measurement value or a temperature measurement value, stored in the ADC register (COUNT) of the chip with selected CHIP_ID X. Operation proceeds from step 734 to step 736. In step 736 the baseband transmitter stores the received measurement value and associates it with the selected chip ID and for power measurement values with a particular front end TX/RX of the selected chip. Operation proceeds from step 736 to step 738, in which the baseband transmitter checks if COUNT=N. If the determination is that COUNT does not equal N, then there are additional stored register values to retrieve from the chip and operation proceeds from step 738 to step 740, in which the value of COUNT is incremented. Operation proceeds from step 740 to the input of step 732 to read another register.

Alternatively, if the determination is that COUNT equals N, then there are no additional stored register values to retrieve from the chip and operation proceeds from step 738 to step 742. In step 742 the baseband transmitter determines if there are other chips in antenna array to process. If the determination is that there are other chips in the array to process then operation proceeds from step 742 to step 744 in which the baseband transmitter selects one of the chip identifiers being used by a chip in the array which has not yet been processed, e.g., CHIP_ID X, where X=00000010. Operation proceeds from step 744 to the input of step 728, in which the baseband transmitter reads the set of N ADC registers corresponding to the currently selected chip.

Returning to step 742, in step 742 if the baseband transmitter determines that there are not any other chips in the antenna array to process, then operation proceeds from step 742, via connecting node B 746, to step 748.

In step 748 the baseband transmitter is operated to process each of the ADC values to estimate power. Step 748 includes step 750, which is performed for each set of ADC values corresponding to a chip ID of the array. In step 750 the baseband transmitter processes ADC values corresponding to a chip. Step 750 includes steps 752 and 753. In step 752 the baseband transmitter converts a temperature sensor value to a temperature via a calibration table. Operation proceeds from step 752 to power measurements processing step 753. Step 753 is performed for each of the, e.g., 8, power detected ADC values stored on the chip, which correspond to different elements (e.g., H-pol 1 TX chain, V-pol 1 TX chain, H-pol 2 TX chain, V-pol 2 TX chain, H-pol 3 TX chain, V-pol 3 TX chain, H-pol 4 TX chain, V-pol 4 TX chain). Power measurements processing step 753 includes step 754, 755, 756 and 758. In step 754 the baseband transmitter use the temperature, obtained from step 752, and a power detected calibration table to convert a power detected ADC value to a calibrated power detected level. Operation proceeds from step 754 to step 755. In step 755 the baseband transmitter stores the determined calibrated power detected level and associates it with the individual power amp (PA) of the chip of the array. Operation proceeds from step 755 to step 756. In step 756 the baseband transmitter scales the calibrated power detected level based on the power amplifier (PA) taper for the element to which the measurement corresponds to determine a scaled calibrated power detected level. Operation proceeds from step 756 to step 758 and in embodiments where the scaled value generated in step 756 is used to check for power amplifier faults to step 792 of FIG. 7D via connecting node D 790 Using the scaled calibrated power detected level to check for faults is optional and not implemented in all embodiments.

In step 792 the baseband transmitter compares the first scaled calibrated power detected level corresponding to the first chip to a target power level for the first chip and then in step 794 determines that a power amplifier failure has occurred when the first scaled calibrated power detected level corresponding to the first chip differs from the target power level for the first chip by more than a first power amplifier fault threshold amount.

In step 796 in response to determining that a power amplifier failure has occurred, the baseband transmitter generates a power failure error alert message or signal in response to determining that the first scaled calibrated power detected level corresponding to the first chip differs from the target power level for the first chip by more than a first power amplifier fault threshold amount.

In step 758 the baseband transmitter stores the determined scaled calibrated power detected level and associates it with the individual power amplifier (PA) of the chip in the array. After step 750 has been performed for each set of ADC values corresponding to a chip ID of the antenna array, then operation proceeds from step 750 to step 760.

In step 760 the baseband transmitter sums the calibrated power detected levels to determine an estimated aggregate array power value. Operation proceeds from step 748 to step 762. In step 762 the baseband transmitter compares the estimated aggregate array power value to a target aggregate array power level desired by the baseband transmitter to generate an array power error. Operation proceeds from step 762 to step 763. In step 763 the baseband transmitter compare individual PA power levels (e.g., determined from the processing) to target levels desired by the baseband transmitter to determine individual PA errors. In some embodiments, step 763 includes comparing individual determined calibrated power detected levels (e.g., stored in step 755 iterations) to target individual power levels to determine errors. In some embodiments, step 763 includes comparing individual determined scaled calibrated power detected levels (e.g., stored in step 758 iteration) to target individual scaled power levels to determine errors. In some embodiments, transmit power errors are also determined on a per chip basis. Operation proceeds from step 762 to step 763. In step 764 the baseband transmitter uses the determined error(s) between the measured power levels and the target power levels to adjust operation of the array, e.g. increase or decrease the gain of a front end IC and/or increase or decrease the gain of an individual selected TX chain. Operation proceeds from step 764, via connecting node 766, to step 706.

Figure 8:
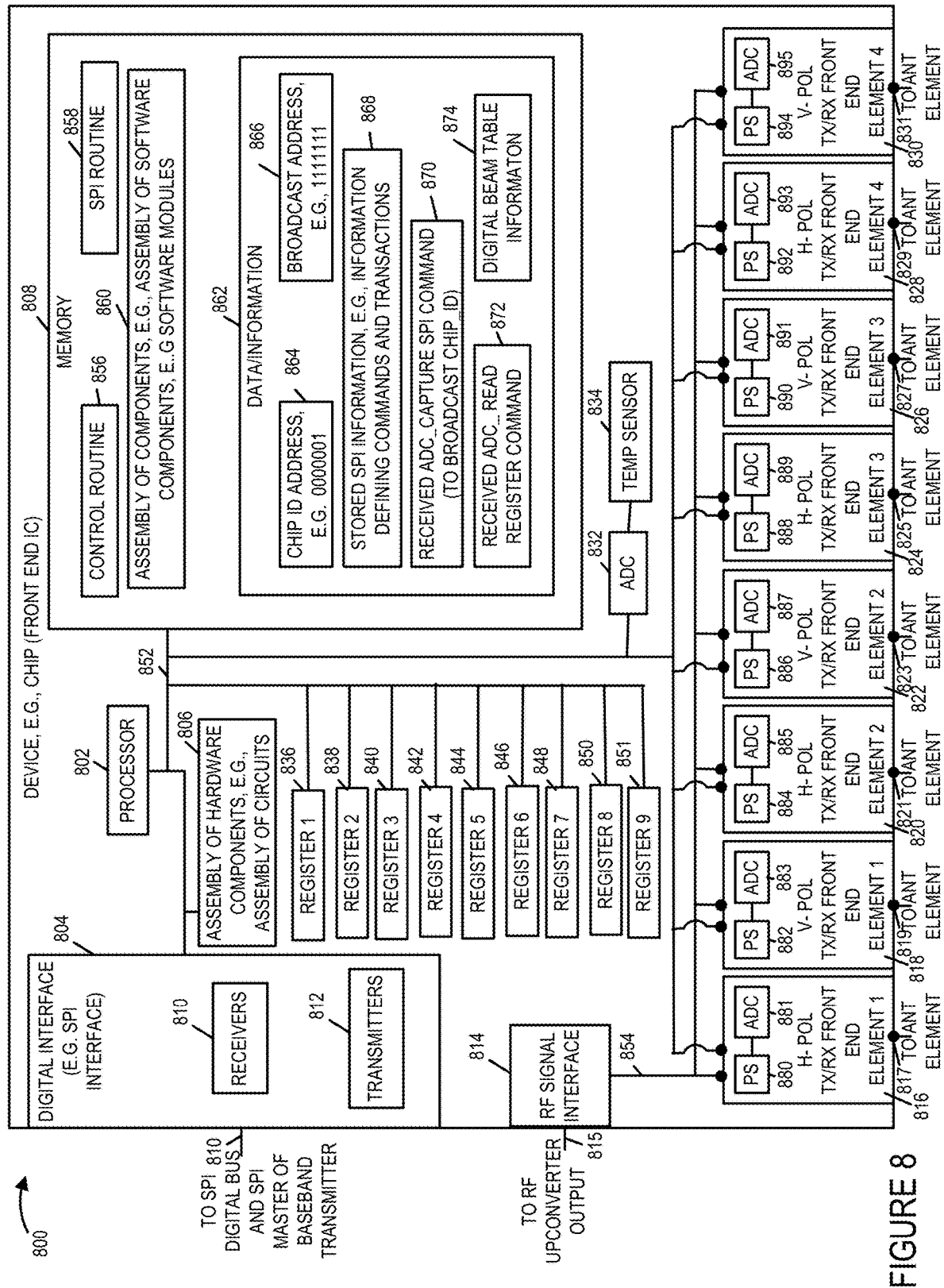
FIG. 8 is a drawing of an exemplary device, e.g., chip, e.g. a front end integrated circuit (IC) chip, including a plurality of front end receive/transmit (RX/TX) circuits, e.g., chains, and an interface, e.g. a serial programmable interface (SPI), in accordance with an exemplary embodiment.

FIG. 8 is a drawing of an exemplary device 800, e.g. chip, e.g. a front end integrated circuit (IC) chip, including a plurality of front end Receive/Transmit (RX/TX) circuits (elements, modules or chains) (816, 818, 820, 824, 826, 828, 830) and a digital interface 804, e.g. a serial programmable interface (SPI interface), in accordance with an exemplary embodiment. Exemplary device 800 is, e.g., one or the chips (420, 422, . . . 424) of phased array antenna assembly 412 of communications device 402 of system 400 of FIG. 4. Exemplary device 800 includes a processor 802, e.g., a CPU, a digital interface 804, e.g., a SPI interface, an assembly of hardware components 806, e.g., an assembly of circuits, and memory 808 coupled together via a bus 852 over which the various elements may interchange data and information.

Device 800 further includes a plurality of TX/RX front end elements (H-Pol TX/RX front end element 1 816, V-Pol TX/RX front end element 1 818, H-Pol TX/RX front end element 2 820, V-Pol TX/RX front end element 2 822, H-Pol TX/RX front end element 3 824, V-Pol TX/RX front end element 3 826, H-Pol TX/RX front end element 4 828, V-Pol TX/RX front end element 4 830). The TX/RX front end elements (816, 818, 820, 822, 824, 826, 828, 830) are sometimes referred to as front end modules or chains. Each of the TX/RX front end chains (816, 818, 820, 822, 824, 826, 828, 830) can be, and sometimes is, configured as a TX chain, e.g. during TX time intervals during a TDD structure in accordance with the communications protocol. Each of the TX/RX front end elements (816, 818, 820, 822, 824, 826, 828, 830) includes a power sensing circuit (880, 882, 884, 886, 888, 890, 892, 894) coupled to an analog to digital (ADC) converter (881, 883, 885, 887, 889, 891, 893, 895), respectively, and further includes an antenna connection point (817, 819, 821, 823, 825, 827, 829, 831), respectively.

Device 800 further includes a temperature sensor 834 for measuring the temperature of the device coupled to an ADC 832 for converting a measured analog temperature signal to a digital value representing the temperature. Device 800 further includes a set of registers (register 1 836, register 2 838, register 3 840, register 4 842, register 5 844, register 6 846, register 7 848, register 8 850, register 9 851), each register (836, 838, 840, 842, 844, 846, 848, 850, 851) corresponds to one of the ADCs (881, 883, 885, 887, 889, 891, 893, 895, 832). In response to a received ADC capture command, the device 800 captures the value in each of the ADCs (881, 883, 885, 887, 889, 891, 893, 895, 832), concurrently, e.g., at an OFDM symbol boundary, which is the end of a predetermined symbol, e.g., a PSS SSB symbol. Eight of the registers contain a power measurement value, e.g. an average transmit power measurement value for a symbol duration, while the ninth register contains a temperature value. Subsequently, the captured values in the registers (836, 838, 840, 842, 844, 846, 848, 850, 851) are communicated to a device, e.g., a baseband transmitter, for processing. In various embodiments, the register values are communicated serially, with each register value being sent in response to a received read register command, e.g. a received ADC read register SPI command.

RF signal interface 814 includes a RF signal connection point 815 for receiving RF signals sent from an RF upconverter's output. The RF signal interface 814 is coupled to each of the TX/RX front ends (816, 818, 820, 822, 824, 826, 828, 830) via connection 854. An RF transmit signal received by RF signal interface 814 is sent as input, via connection 854, to a transmit chain of each of the front ends (816, 818, 820, 822, 824, 826, 828, 830).

Memory 808 includes a control routine 856 for controlling basic device functional operations, a SPI routine 858 for controlling SPI interface, processing received SPI commands from an SPI master, implementing SPI transactions, etc., an assembly of components 860, e.g. an assembly of software components, e.g. software modules, and data/information 862. In some embodiments, the assembly of components 860 includes software modules, e.g. code, which when executed by a processor, e.g. processor 802, implements one ore more steps of the method of flowchart 700 of FIG. 7. In some embodiments, one or more steps of the method of flowchart 700 of FIG. 7 are implemented by components of assembly of hardware components 806.

Data/information 862 includes a chip ID address 864 corresponding to device 800, e.g., an 8 bit address such as 00000001, a broadcast address, e.g., an 8 bit address such as 11111111. Different chips 800, e.g. different front end IC chips within an antenna array within a communications device such as communications device 402, e.g. an access point, have different corresponding chip ID addresses 864. Data/information 862 further includes stored SPI information 868, e.g. information defining a set of SPI commands and SPI transactions, a received ADC CAPTURE command 870, e.g. sent to a broadcast chip_ID address, a received ADC Read Register command 872 addressed to the chip_ID address corresponding to particular device 800, e.g. address=00000001, and further identifying one of the registers (836, 838, 840, 842, 844, 846, 848, 850, 851) to be read in response to this received command. Device 800 will receive, e.g., sequentially, an ADC_Read Register command for each of the registers (836, 838, 840, 842, 844, 846, 848, 850, 851). Data/information 862 further includes digital beam table information 874, e.g. settings for each of the gain and phase elements in each of the front ends, e.g. corresponding to a desired transmit beam. Beam table information 874 includes beam taper information, e.g. amplitude tapering information.

Figure 9:
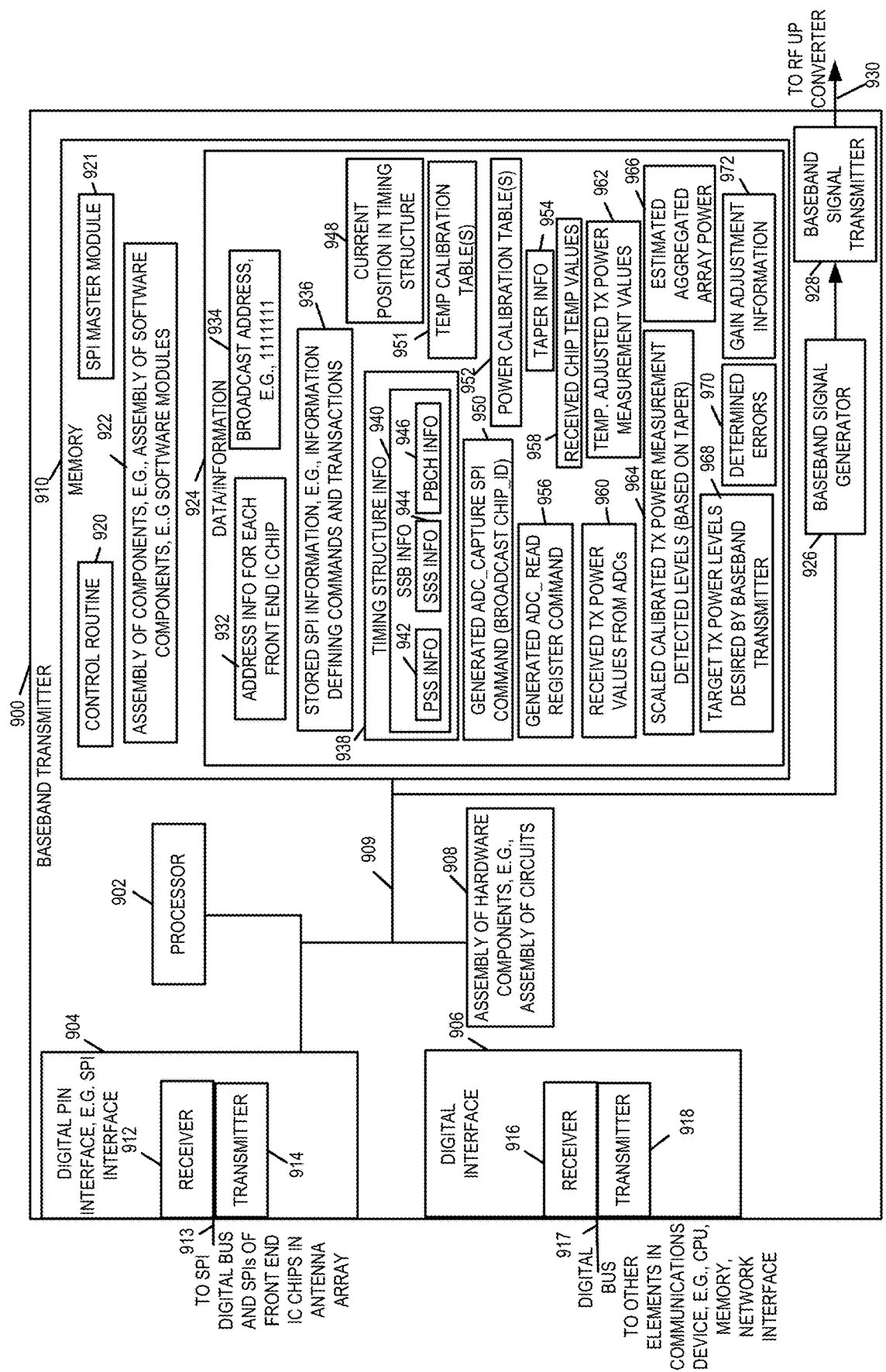
FIG. 9 is a drawing of an exemplary baseband transmitter in accordance with an exemplary embodiment.

FIG. 9 is a drawing of an exemplary baseband transmitter 900 in accordance with an exemplary embodiment. Baseband transmitter 900 is, e.g., baseband transmitter 408 of communications device 402 of communications system 400 of FIG. 4. Baseband transmitter 900 includes a processor 902, digital pin interface 904, e.g., an SPI interface, a digital interface 906, an assembly of hardware components 908, e.g., assembly of circuits, a memory 910, and a baseband signal generator 926 coupled to a bus 909 over which the various elements may interchange data and information. Digital pin interface 904, e.g., a SPI interface configured to be a master, couples baseband transmitter 904 to a bus 913, e.g., a SPI bus, and to one or more chips, e.g., IC front end chips, included in a phased array antenna assembly. Digital pin interface 904, e.g., a SPI interface, includes a receiver 912 and a transmitter 914. Exemplary signals sent via transmitter 914 include a ADC capture command and a ADC register read command. Exemplary signals received via receiver 912 includes a signal conveying an ADC register value conveying a measured transmit power or measured chip temperature.

Digital interface 906 includes a receiver 916 and a transmitter 918. The digital interface 908 is connected to a digital bus 917 which couples the baseband transmitter to other elements, e.g. a CPU, memory, network interface, etc., in the communications device including the baseband transmitter 900.

Memory 910 includes a control routine 920 for performing basic operations such as memory access and controlling I/O via digital interface 906, and SPI master module 921, e.g., a block of code for controlling operation of the SPI interface 904 acting as a master, an assembly of components 922, e.g., assembly of software components, e.g., software modules, and data/information 924. In some embodiments, assembly of components 922, includes software module(s), e.g. code, which when implemented by a processor, e.g., processor 902, implements one or more steps of a method, e.g. steps of the method of flowchart 700 of FIG. 7. In some embodiments, assembly of components 908, includes hardware components, e.g. circuitry, which implements one or more steps of a method, e.g. steps of the method of flowchart 700 of FIG. 7.

Data/information 924 includes address information 932 for each front end IC chip, e.g., a unique address to be used for communications via the SPI interface, for each of one or more front end IC chips of an antenna array assembly which are to be controlled by the baseband transmitter, e.g., address value=00000001 for IC chip1, address value=000000010 for IC chip2, etc., and a broadcast address 934, e.g., address value=11111111, to be used for the SPI interface to send broadcast signals, e.g. an ADC capture command to each of the chips in the antenna array assembly. Data/information 924 further includes stored SPI information 936, e.g. information defining SPI commands and transactions such as, e.g., an ADC capture command, an ADC capture command transaction, an ADC register read command and an ADC register read transaction. Data/information 924 further includes timing structure information 938, e.g., information pertaining to a TDD timing structure being used by the communications device including baseband transmitter 900. Timing structure information 938 includes synchronization symbol block (SSB) information 940, e.g., information defining time/frequency resource blocks corresponding to the SSB within the timing structure of the protocol being used, information defining the symbols of the SSB and information identifying symbol boundaries. SSB information 940 includes primary synchronization signal (PSS) information 942, e.g. information identifying resource blocks (RBs) of the SSB used to convey the PSS and information (including transmit power level information) identifying the known signals transmitted on the RBs corresponding to the PSS. SSB information 940 further includes secondary synchronization signal (SSS) information 944, e.g. information identifying resource blocks of the SSB used to convey the SSS and information (including transmit power level information) identifying the known signals transmitted on the RBs corresponding to the SSS. SSB information 940 further includes physical broadcast channel (PBCH) information 946, e.g. information identifying resource blocks of the PBCH used to convey the PBCH signals and information (including transmit power level information) identifying the known signals transmitted on the RBs corresponding to the PBCH. Data/information 924 further includes current position in timing structure 948, e.g., used in determining when a predetermined symbol (e.g., a predetermined symbol used for collecting power transmit measurements for the antenna array), e.g., a PSS symbol of a SSB, will be transmitted. This is used to trigger synchronized ADC capture.

Data/information 924 further includes temperature calibration table(s) 951, power calibration table(s) 952, and taper information 954, e.g. taper gain information for the antenna array assembly. Data/information 924 further includes a generated ADC_Capture SPI command 950, e.g., which is sent to a broadcast address monitored by the IC front end chips of the antenna array assembly, e.g. CHIP_ID address value=11111111 signifying broadcast address, a generated ADC_Read Register Command 956 which is sent to a chip address being used by one of the front end IC chips of the antenna array assembly to read one of the ADC registers following the ADC_Capture command, received chip temperature values 958, received transmit (TX) power values 960 from the ADCs, temperature adjusted TX power measurement values 962, scaled calibrated TX power measurement detected levels 964 (based on taper), estimated aggregated array power 966, target TX power levels 968 desired by the baseband transmitter (e.g., an aggregate array power target level, individual target power levels corresponding to each PA, and individual scaled target power levels corresponding to each PA), determined errors 970 (an array power error, individual power errors associated with individual PAs and/or TX chains, power errors associated with individual chips, etc.) e.g. based on comparisons of adjusted measurements to desired target levels, and gain adjustment information 972, e.g., a determined increase or decrease in the gain of a front end IC one a per chip basis and/or on an individual TX chain basis.

Various aspects and/or features of some embodiments of the present invention are further described below.

In some embodiments, each IC includes multiple PAs connected to multiple antenna elements with a power detector and an analog to digital convertor (ADC) connected to each antenna output. The output of each power detector is filtered with a low-pass filter matched to the symbol duration. This effectively averages the output power over the symbol period. The system also includes a controller coupled to a SPI interface. This controller can command each of the ADCs to simultaneously sample the filtered power detector input with a sample and hold circuit. Further this controller is responsive to a broadcast command so that all front-end ICs in the antenna array can be commanded to sample synchronously with a single command.

In some embodiments, the ADC sample and hold is triggered at the 16th clock (CLK) cycle of the ADC_CAPTURE transaction. The baseband transmitter, in some embodiments, has a SPI master for communicating with the array which is capable of sending a SPI transaction based on a synchronization signal from the protocol. This baseband modulator shall send the ADC_CAPTURE SPI command such that the sample and hold operation is executed at a point in time when the OFDM symbol boundary for the desired symbol (i.e. SSB PSS symbol) is being output to the antenna by the PA. Then the sampled power detector values for each of the ICs in the array can be read and processed to generate a power measurement for the array.

In some embodiments, the processing of the ADC values includes converting the temperature sensor ADC value to a temperature via a calibration table. Using the temperature and a power detector calibration table, the power detector ADC values are converted to calibrated power levels. The calibrated power detector power levels are scaled, based on the PA amplitude taper for each element, to obtain scaled calibrated power detector power levels for each element. The calibrated power levels are summed to estimate the aggregated array power. The aggregated array power and the individual PA power levels are compared to the target levels desired by the baseband transmitter. The baseband transmitter may, and sometimes does, use the errors between the measured and/or scaled power levels and the target power levels to adjust operation of the array such as increasing or decreasing the gain of a front end IC and/or the gain of an individual TX chain in a front end IC.

Errors between the scaled power levels and target power levels of each individual PA can be and sometimes are used to detect malfunctioning PAs. For example in some embodiments when a difference between a scaled power level and target power level for an individual PA exceeds a predetermined, e.g., fixed error threshold, a PA malfunction is declared and an error message or other alarm indicating which the PA has failed is generated and communicated to a user of the device as an audio alarm or electronic message or alert.

The above description assumes that the measurement is conducted on a known signal, the SSB. In some embodiments, the baseband transmitter could, and sometimes does, measure the power of the baseband modulated signal as it is output to the front end to generate the power target for an unknown signal (i.e. with user data). The target should also be, and is, averaged over the symbol period and sampled at the symbol boundary for the reasons described above.

NUMBERED LIST OF EXEMPLARY METHOD EMBODIMENTS

Method Embodiment 1

A method of operating a communication device, the method comprising: operating (706) a baseband transmitter (706) to determine, based on a timing structure of a communications protocol, when a predetermined symbol (e.g., a synchronization symbol of a synchronization symbol block) will be transmitted; operating the baseband transmitter to send (712) a capture command to an address monitored by an SPI interface of a first chip in a transmission array included in said communications device (the transmission array includes multiple transmit antennas and one or more chips, said first chip being one of said one or more chips); and operating (719) the first chip to capture one or more transmit power values (e.g., one transmit power value for each transmit chain of the first chip), each of the one or more transmit power values being sensed at a point in time when an OFDM symbol boundary for the predetermined symbol is being output by the first chip to transmit antenna elements coupled to said first chip.

Method Embodiment 1C

The method of Method Embodiment 1 wherein the first chip includes multiple transmit chains, a separate transmit power value being sensed for each transmit chain.

Method Embodiment 1A

The method of Method Embodiment 1C, wherein said captured command is an (analog to digital converter) ADC capture command.

Method Embodiment 1D

The method of Method Embodiment 1AA, wherein the communications device includes multiple chips.

Method Embodiment 1AA

The method of Method Embodiment 1D, wherein the first chip includes at least one horizontal polarization transmit chain and at least one vertical polarization transmit chain.

Method Embodiment 1E

The method of Method Embodiment 1D, wherein said capture command is a command which is sent to a broadcast address monitored by the SPI interfaces of said multiple chips.

Method Embodiment 1AAA

The method of Method Embodiment 1D, wherein each of said multiple chips includes 4 horizontal polarization transmit chains and 4 vertical polarization transmit chains.

Method Embodiment 1B

The method of Method Embodiment 1C, wherein a captured transmit power value is an average transmit power value for the predetermined symbol.

Method Embodiment 1B1

The method of Method Embodiment 1C, wherein the captured transmit power value is a sample value of a filtered power measurement.

Method Embodiment 1a

The method of Method Embodiment 1C, wherein said predetermined symbol is a synchronization symbol of a synchronization symbol block.

Method Embodiment 1aa

The method of Method Embodiment 1a, wherein said synchronization symbol is one or a Primary Synchronization Signal (PSS) symbol, Secondary Synchronization Signal/Physical Broadcast Channel (SSS/PBCH) symbol or PBCH symbol.

Method Embodiment 1AB

The method of Method Embodiment 1D wherein an SPI interface of the baseband transmitter is a master with respect to the SPI interfaces of the multiple chips in the array.

Method Embodiment 2

The method of Method Embodiment 1C, wherein operating the baseband transmitter to send a capture command is performed at a predetermined number of clock cycles (e.g., 16) prior to the occurrence of said OFDM symbol boundary.

Method Embodiment 3

The method of Method Embodiment 1D, further comprising: operating (718) each of the multiple chips in the array to capture a temperature sensor value when the OFDM symbol boundary for the predetermined symbol is being output by the chips to corresponding antennas.

Method Embodiment 3a

The method of Method Embodiment 3, wherein said captured transmit power values and said temperature sensor value, corresponding to a chip, are stored in registers on the chip.

Method Embodiment 4

The method of Method Embodiment 1D, wherein said multiple chips includes at least said first chip and a second chip, the method further comprising: operating the first chip to store (720) a first sensed transmit power value and a first sensed temperature value; and operating the second chip to store (720) a second sensed transmit power value and a second sensed temperature value.

Method Embodiment 5

The method of Method Embodiment 4, further comprising: operating (724) the base band transmitter to use a first address (e.g., non-broadcast address such as a unicast address) corresponding to a first SPI interface of the first chip to retrieve the first sensed transmit power value and the first sensed temperature value; and operating (724) the base band transmitter to use a second address (e.g., non-broadcast address such as a unicast address) corresponding to a second SPI interface of the second chip to retrieve the second sensed transmit power value and the second sensed temperature value.

Method Embodiment 5A

The method of Method Embodiment 5, wherein the transmit power and temperature values sensed by different chips are retrieved sequentially (e.g. the values corresponding to the first chip are retrieved and then the values corresponding to the second chip).

Method Embodiment 6

The method of Method Embodiment 5, further comprising: operating (752) the baseband transmitter to use a first temperature calibration table to convert the first sensed temperature value to a first temperature.

Method Embodiment 7

The method of Method Embodiment 6, further comprising: generate (754), based on the first temperature and a first power calibration table, a first calibrated power detected level corresponding to the first chip.

Method Embodiment 7A

The method of Method Embodiment 7 further comprising: comparing the first scaled calibrated power detected level corresponding to the first chip to a target power level for the first chip; determining that a power amplifier failure has occurred when the first scaled calibrated power detected level corresponding to the first chip differs from the target power level for the first chip by more than a first power amplifier fault threshold amount.

Method Embodiment 7B

The method of Method Embodiment 7A, further comprising: generating a power failure error alert message or signal in response to determining that the first scaled calibrated power detected level corresponding to the first chip differs from the target power level for the first chip by more than a first power amplifier fault threshold amount.

Method Embodiment 8

The method of Method Embodiment 7, further comprising: summing (760) the calibrated power detected levels corresponding to individual ones of said multiple chips to generate an estimated aggregate array power value.

Method Embodiment 9

The method of Method Embodiment 8, further comprising: operating (762) the baseband transmitter to compare the estimated aggregate array power value to a target aggregate array power level for the baseband transmitter to generate an array power error; and operating (764) the baseband transmitter to change the gain of one or more transmit chains based on the array power error.

NUMBERED LIST OF EXEMPLARY APPARATUS EMBODIMENTS

Apparatus Embodiment 1

A communications device (402), the communications device (402) comprising: a transmission array (412) including one or more chips (420, 422, 424), said one or more chips including a first chip (420 or 800); and a baseband transmitter (408 or 900), said baseband transmitter (408 or 900) includes a first processor (902) configured to: operate (706) the baseband transmitter (408 or 900) to determine, based on a timing structure of a communications protocol, when a predetermined symbol (e.g., a synchronization symbol of a synchronization symbol block) will be transmitted; and operate the baseband transmitter (408 or 900) to send (712) (e.g., via its SPI interface (426 or 904)) a capture command to an address monitored by an SPI interface (440 or 804) of a first chip (420) in a transmission array (412) included in said communications device (402) (the transmission array includes multiple transmit antennas and one or more chips, said first chip being one of said one or more chips); and wherein the first chip (420 or 800) includes a second processor (802) configured to: operate (719) the first chip (420 or 800) to capture one or more transmit power values (e.g., one transmit power value for each transmit chain of the first chip), each of the one or more transmit power values being sensed at a point in time when an OFDM symbol boundary for the predetermined symbol is being output by the first chip to transmit antenna elements coupled to said first chip.

Apparatus Embodiment 1C

The communications device (402) of Apparatus Embodiment 1 wherein the first chip (420 or 800) includes multiple transmit chains (816, 818, 820, 822, 824, 826, 828, 830), a separate transmit power value being sensed for each transmit chain.

Apparatus Embodiment 1A

The communications device (402) of Apparatus Embodiment 1C, wherein said captured command is an (analog to digital converter) ADC capture command.

Apparatus Embodiment 1AA

The communications device (402) of Apparatus Embodiment 1C, wherein the first chip (420 or 800) includes at least one horizontal polarization transmit chain (816) and at least one vertical polarization transmit chain (818).

Apparatus Embodiment 1D

The communications device (402) of Apparatus Embodiment 1AA, wherein the communications device (402) includes multiple chips (420, 422, 424).

Apparatus Embodiment 1E

The communications device (402) of Apparatus Embodiment 1D, wherein said capture command is a command which is sent to a broadcast address monitored by the SPI interfaces (440, 440', 440") of said multiple chips (420, 422, 424).

Apparatus Embodiment 1AAA

The communications device (402) of Apparatus Embodiment 1D, wherein each of said multiple chips (420, 422, 424) includes 4 horizontal polarization transmit chains (816, 820, 824, 828) and 4 vertical polarization transmit chains (818, 822, 826, 830).

Apparatus Embodiment 1B

The communications device (402) of Apparatus Embodiment 1C, wherein a captured transmit power value is an average transmit power value for the predetermined symbol.

Apparatus Embodiment 1B1

The communications device (402) of Apparatus Embodiment 1C, wherein the captured transmit power value is a sample value of a filtered power measurement.

Apparatus Embodiment 1a

The communications device (402) of Apparatus Embodiment 1c, wherein said predetermined symbol is a synchronization symbol (122, 124, 126, or 128) of a synchronization symbol block (116).

Apparatus Embodiment 1aa

The communications device (402) of Apparatus Embodiment 1a, wherein said synchronization symbol is one or a Primary Synchronization Signal (PSS) symbol (122), Secondary Synchronization/Physical Broadcast (126) Channel (SSS/PBCH) symbol or PBCH symbol (124 or 128).

Apparatus Embodiment 1AB

The communications device (402) of Apparatus Embodiment 1D wherein an SPI interface (426 or 904) of the baseband transmitter (408 or 900) is a master with respect to the SPI interfaces (440, 440', 440") of the multiple chips (420, 422, 424) in the array (412).

Apparatus Embodiment 2

The communications device (402) of Apparatus Embodiment 1C, wherein operating the baseband transmitter (408 or 900) to send a capture command is performed at a predetermined number of clock cycles (e.g., 16) prior to the occurrence of said OFDM symbol boundary (123, 125, 127 or 129).

Apparatus Embodiment 3

The communications device (402) of Apparatus Embodiment 1D, wherein said multiple chips (420, 422, 424) in the array includes said first chip (420) and a second chip (422); wherein said second chip (422 or 800) includes a second processor (802); and wherein said first chip (420) is configured to operate (718) the first chip (420) in the array (412) to capture a temperature sensor value when the OFDM symbol boundary for the predetermined symbol is being output by the first chip (420) to corresponding antenna elements (421); and wherein said second chip (422) is configured to operate (718) the second chip (422) in the array (412) to capture a temperature sensor value when the OFDM symbol boundary for the predetermined symbol is being output by the second chip (422) to corresponding antenna elements (423).

Apparatus Embodiment 3a

The communications device (402) of Apparatus Embodiment 3, wherein said captured transmit power values and said temperature sensor value, corresponding to a chip (800), are stored in registers (836, 838, 840, 842, 844, 846, 848, 850, 851) on the chip (800).

Apparatus Embodiment 4

The communications device (402) of Apparatus Embodiment 1D, wherein said multiple chips (420, 422, 424) includes at least said first chip (420) and a second chip (422), and wherein said second chip (422) includes a third processor (802); and wherein said second processor (802) is further configured to operate the first chip (420) to store (720) a first sensed transmit power value and a first sensed temperature value; and wherein said third processor (802) is configured to operate the second chip (422) to store (720) a second sensed transmit power value and a second sensed temperature value.

Apparatus Embodiment 5

The communications device (402) of Apparatus Embodiment 4, wherein said first processor (902) is further configured to: operate (724) the base band transmitter (408 or 900) to use a first address (e.g., non-broadcast address such as a unicast address) corresponding to a first SPI interface (440) of the first chip (420) to retrieve the first sensed transmit power value and the first sensed temperature value; and operate (724) the base band transmitter (408 or 900) to use a second address (e.g., non-broadcast address such as a unicast address) corresponding to a second SPI interface (440') of the second chip (422) to retrieve the second sensed transmit power value and the second sensed temperature value.

Apparatus Embodiment 5A

The communications device (402) of Apparatus Embodiment 5, wherein the transmit power and temperature values sensed by different chips (420, 422) are retrieved sequentially (e.g. the values corresponding to the first chip are retrieved and then the values corresponding to the second chip).

Apparatus Embodiment 6

The communications device (402) of Apparatus Embodiment 5, wherein said first processor (902) is further configured to: operate (752) the baseband transmitter (402 or 900) to use a first temperature calibration table (951) to convert the first sensed temperature value to a first temperature.

Apparatus Embodiment 7

The communications device (402) of Apparatus Embodiment 6, wherein said first processor (902) is further configured to: generate (754), based on the first temperature and a first power calibration table (952), a first calibrated power detected level corresponding to the first chip (420).

Apparatus Embodiment 8

The communications device (402) of Apparatus Embodiment 7, wherein said first processor (902) is further configured to: sum (760) the calibrated power detected levels corresponding to individual ones of said multiple chips (420, 422, 424) to generate an estimated aggregate array power value.

Apparatus Embodiment 9

The communications device (402) of Apparatus Embodiment 8, wherein said first processor (902) is further configured to: operate (762) the baseband transmitter (408 or 900) to compare the estimated aggregate array power value to a target aggregated array power level for the baseband transmitter (408 or 900) to generate an array power error; and operate (764) the baseband transmitter (408 or 900) to change the gain of one or more transmit chains (816, 818, 820, 822, 824, 826, 828, 830) based on the array power error (e.g., change value of one or more gain elements (668', 669', 668", 669", 668''', 669''', 668'''', 669'''') in one or more transmit chains of one or more chips).

The techniques of various embodiments may be implemented using software, hardware and/or a combination of software and hardware. Various embodiments are directed to apparatus and/or systems, e.g., communications devices, wireless communications systems, wireless terminals, user equipment (UE) devices, access points, e.g., a WiFi wireless access point, a cellular wireless AP, e.g., an eNB or gNB, user equipment (UE) devices, a wireless cellular systems, e.g., a cellular system, WiFi networks, etc. Various embodiments are also directed to methods, e.g., method of controlling and/or operating a system or device, e.g., a communications system, an access point, a base station, a wireless terminal, a UE device, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments nodes and/or elements described herein are implemented using one or more components to perform the steps corresponding to one or more methods, for example, controlling, establishing, generating a message, message reception, signal processing, sending, communicating, e.g., receiving and transmitting, comparing, making a decision, selecting, making a determination, modifying, controlling determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a wireless communications device including a multi-element antenna array supporting beam forming, such as a cellular AP or Wifi AP, a wireless terminal, a UE device, etc., including a processor configured to implement one, multiple or all of the steps of one or more methods of the invention.

In some embodiments, the processor or processors, e.g., CPUs, of one or more devices, are configured to perform the steps of the methods described as being performed by the devices, e.g., communication nodes. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., access point, with a processor which includes a component corresponding to each of the steps of the various described methods performed by the device in which the processor is included. In some but not all embodiments a device, e.g., wireless communications node such as an access point or base station, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a wireless communications device such as an access point. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a wireless communications device such as an access point described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a communication device, the method comprising:
    operating a baseband transmitter to determine, based on a timing structure of a communications protocol, when a predetermined symbol will be transmitted;
    operating the baseband transmitter to send a capture command to an address monitored by an SPI interface of a first chip in a transmission array included in said communications device; and
    operating the first chip to capture one or more transmit power values, each of the one or more transmit power values being sensed at a point in time when an OFDM symbol boundary for the predetermined symbol is being output by the first chip to transmit antenna elements coupled to said first chip.

2. The method of claim 1, wherein the communications device includes multiple chips.

3. The method of claim 2, wherein operating the baseband transmitter to send a capture command is performed at a predetermined number of clock cycles prior to the occurrence of said OFDM symbol boundary.

4. The method of claim 2, further comprising:
    operating each of the multiple chips in the array to capture a temperature sensor value when the OFDM symbol boundary for the predetermined symbol is being output by the chips to corresponding antennas.

5. The method of claim 2, wherein said multiple chips includes at least said first chip and a second chip, the method further comprising:
    operating the first chip to store a first sensed transmit power value and a first sensed temperature value; and operating the second chip to store a second sensed transmit power value and a second sensed temperature value.

6. The method of claim 5, further comprising:
operating the baseband transmitter to use a first address corresponding to a first SPI interface of the first chip to retrieve the first sensed transmit power value and the first sensed temperature value; and
operating the baseband transmitter to use a second address corresponding to a second SPI interface of the second chip to retrieve the second sensed transmit power value and the second sensed temperature value.

7. The method of claim 6, further comprising:
operating the baseband transmitter to use a first temperature calibration table to convert the first sensed temperature value to a first temperature.

8. The method of claim 7, further comprising:
generating, based on the first temperature and a first power calibration table, a first scaled calibrated power detected level corresponding to the first chip.

9. The method of claim 8 further comprising:
comparing the first scaled calibrated power detected level corresponding to the first chip to a target power level for the first chip; and
determining that a power amplifier failure has occurred when the first scaled calibrated power detected level corresponding to the first chip differs from the target power level for the first chip by more than a first power amplifier fault threshold amount.

10. The method of claim 8, further comprising:
summing scaled calibrated power detected levels corresponding to individual ones of said multiple chips to generate an estimated aggregate array power value;
operating the baseband transmitter to compare the estimated aggregate array power value to a target aggregate array power level for the baseband transmitter to generate an array power error; and
operating the baseband transmitter to change the gain of one or more transmit chains based on the array power error.

11. A communications device, the communications device comprising:
a transmission array including one or more chips, said one or more chips including a first chip; and
a baseband transmitter, said baseband transmitter including a first processor configured to:
operate the baseband transmitter to determine, based on a timing structure of a communications protocol, when a predetermined symbol will be transmitted; and
operate the baseband transmitter to send a capture command to an address monitored by an SPI interface of the first chip in the transmission array included in said communications device; and
wherein the first chip includes a second processor configured to:
operate the first chip to capture one or more transmit power values, each of the one or more transmit power values being sensed at a point in time when an OFDM symbol boundary for the predetermined symbol is being output by the first chip to transmit antenna elements coupled to said first chip.

12. The communications device of claim 11, wherein the communications device includes multiple chips.

13. The communications device of claim 12, wherein operating the baseband transmitter to send a capture command is performed at a predetermined number of clock cycles prior to the occurrence of said OFDM symbol boundary.

14. The communications device of claim 12, wherein said multiple chips in the array includes said first chip and a second chip;
wherein said second chip includes a second processor;
wherein said first chip is configured to operate the first chip in the array to capture a temperature sensor value when the OFDM symbol boundary for the predetermined symbol is being output by the first chip to corresponding antenna elements; and
wherein said second chip is configured to operate the second chip in the array to capture a temperature sensor value when the OFDM symbol boundary for the predetermined symbol is being output by the second chip to corresponding antenna elements.

15. The communications device of claim 12, wherein said multiple chips includes at least said first chip and a second chip, and wherein said second chip includes a third processor; and
wherein said second processor is further configured to operate the first chip to store a first sensed transmit power value and a first sensed temperature value; and
wherein said third processor is configured to operate the second chip to store a second sensed transmit power value and a second sensed temperature value.

16. The communications device of claim 15, wherein said first processor is further configured to:
operate the baseband transmitter to use a first address corresponding to a first SPI interface of the first chip to retrieve the first sensed transmit power value and the first sensed temperature value; and
operate the baseband transmitter to use a second address corresponding to a second SPI interface of the second chip to retrieve the second sensed transmit power value and the second sensed temperature value.

17. The communications device of claim 16, wherein said first processor is further configured to:
operate the baseband transmitter to use a first temperature calibration table to convert the first sensed temperature value to a first temperature.

18. The communications device of claim 17, wherein said first processor is further configured to:
generate, based on the first temperature and a first power calibration table, a first calibrated power detected level corresponding to the first chip.

19. The communications device of claim 18, wherein said first processor is further configured to:
sum calibrated power detected levels corresponding to individual ones of said multiple chips to generate an estimated aggregate array power value.

20. The communications device of claim 19, wherein said first processor is further configured to:
operate the baseband transmitter to compare the estimated aggregate array power value to a target aggregate array power level for the baseband transmitter to generate an array power error; and
operate the baseband transmitter to change the gain of one or more transmit chains based on the array power error.

* * * * *